United States Patent
Yao et al.

(10) Patent No.: US 12,075,361 B2
(45) Date of Patent: Aug. 27, 2024

(54) POWER CONTROL METHOD, APPARATUS AND SYSTEM

(71) Applicant: ZTE CORPORATION, Shenzhen (CN)

(72) Inventors: Ke Yao, Shenzhen (CN); Chuangxin Jiang, Shenzhen (CN); Bo Gao, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 380 days.

(21) Appl. No.: 17/599,938

(22) PCT Filed: Mar. 23, 2020

(86) PCT No.: PCT/CN2020/080671
§ 371 (c)(1),
(2) Date: Sep. 29, 2021

(87) PCT Pub. No.: WO2020/199956
PCT Pub. Date: Oct. 8, 2020

(65) Prior Publication Data
US 2022/0201619 A1    Jun. 23, 2022

(30) Foreign Application Priority Data
Mar. 29, 2019 (CN) .......................... 201910252454.0

(51) Int. Cl.
*H04W 52/14* (2009.01)
*H04W 72/044* (2023.01)

(52) U.S. Cl.
CPC ....... *H04W 52/146* (2013.01); *H04W 72/046* (2013.01)

(58) Field of Classification Search
CPC ............. H04W 52/146; H04W 72/046; H04W 52/242; H04W 52/42; H04W 52/365;
(Continued)

(56) References Cited

U.S. PATENT DOCUMENTS

| 2016/0014778 A1 | 1/2016 | Zhou et al. |
| 2018/0287681 A1 | 10/2018 | Chen et al. |

(Continued)

FOREIGN PATENT DOCUMENTS

| CN | 104685923 A | 6/2015 |
| CN | 108134659 A | 6/2018 |

(Continued)

OTHER PUBLICATIONS

CATT. "R-1-1812635: Multi-TRP/Panel Transmission Enhancement for Rel-16" *3GPP TSG RAN WG1 Meeting #95*, Nov. 16, 2018 (Nov. 16, 2018), sections 2-6.
(Continued)

*Primary Examiner* — Un C Cho
*Assistant Examiner* — Lalita W Pace
(74) *Attorney, Agent, or Firm* — Morgan, Lewis & Bockius LLP

(57) ABSTRACT

Provided are a power control method, apparatus and system. The power control method includes the following steps, an association between at least one piece of spatial domain resource information and a power control parameter is acquired; spatial domain resource information of an uplink transmission is acquired; and a power control parameter of the uplink transmission is determined according to the spatial domain resource information of the uplink transmission and the association between the at least one piece of spatial domain resource information and the power control parameter; where the spatial domain resource information includes at least one type of control resource set, CORESET, (Continued)

information, transmit-receive point, TRP, information, or physical uplink control channel, PUCCH, resource information.

18 Claims, 4 Drawing Sheets

(58) Field of Classification Search
CPC ............... H04W 52/18; H04W 72/121; H04W 72/1268; H04W 72/23; H04W 52/08; H04W 52/10; H04W 52/04; H04W 52/06; H04L 5/0023; H04L 5/0053
See application file for complete search history.

(56) References Cited

U.S. PATENT DOCUMENTS

| | | | | |
|---|---|---|---|---|
| 2018/0332541 | A1* | 11/2018 | Liu | H04W 52/10 |
| 2019/0230599 | A1* | 7/2019 | Nam | H04W 52/18 |
| 2019/0349867 | A1* | 11/2019 | MolavianJazi | H04W 52/40 |
| 2019/0364511 | A1* | 11/2019 | Chen | H04W 52/325 |
| 2020/0205082 | A1* | 6/2020 | Chen | H04L 5/0094 |
| 2020/0229104 | A1* | 7/2020 | MolavianJazi | H04W 72/1268 |
| 2020/0314860 | A1* | 10/2020 | Zhou | H04W 72/23 |
| 2022/0070855 | A1* | 3/2022 | Zhang | H04W 72/51 |

FOREIGN PATENT DOCUMENTS

| | | |
|---|---|---|
| CN | 110536394 A | 12/2019 |
| WO | WO2018228487 A1 | 12/2018 |

OTHER PUBLICATIONS

International Search Report for Application No. PCT/CN2020/080671, dated Jun. 23, 2020, 4 pages including English translation.
Ericsson, "Further details on closed loop power control", *3GPP TSG RAN WG1 Meeting 90*bis, R1-1718655, Prague, CZ, Oct. 9-13, 2017, 4 pages.
Extended European Search Report for Application No. 20782805.4, dated Nov. 24, 2022, 9 pages including translation.
Office Action for Chinese Application No. 201910252454.0, dated Apr. 20, 2023, 11 pages including translation.
Search Report for Chinese Application No. 201910252454.0, dated Apr. 18, 2023, 5 pages including translation.

\* cited by examiner

POWER CONTROL METHOD, APPARATUS AND SYSTEM

CROSS-REFERENCES TO RELATED APPLICATIONS

This is a National Stage Application, filed under 35 U.S.C. 371, of International Patent Application No. PCT/CN2020/080671, filed on Mar. 23, 2020, which is based on and claims priority to Chinese Patent Application No. 201910252454.0, filed with the China National Intellectual Property Administration (CNIPA) on Mar. 29, 2019, disclosure of which is incorporated herein by reference in its entirety.

TECHNICAL FIELD

The present application relates to the field of wireless communication networks, and for example, a power control method, a power control apparatus and power control system.

BACKGROUND

In the next generation of mobile communication networks, a critical requirement on an ultra-high rate has been raised. A base station is configured with multiple transmit-receive points (TRPs), so that the requirement of the ultra-high rate may be satisfied to a certain extent. When the base station is configured with the multiple TRPs, on one hand, a number of antennas may be increased, and on the other hand, the multiple TRPs may obtain more links with larger differences at different physical positions, so that the signal blockage can be avoided.

However, when the base station is configured with the multiple TRPs, physical positions of different TRPs may be far away from each other, a link difference between each TRP and a user equipment (UE) is relatively large, a power control between each TRP and the UE should be independent. While in a power control mechanism, a number of power control parameters is relatively small, and the flexibility is insufficient when the base station is applied in a multi-TRP scenario.

SUMMARY

Embodiments of the present application provide a power control method, a power control apparatus and a power control system, so that the flexibility of a power control is improved.

An embodiment of the present application provides a power control method. The method is described below, an association between at least one piece of spatial domain resource information and a power control parameter is acquired; spatial domain resource information of an uplink transmission is acquired; and a power control parameter of the uplink transmission is determined according to the spatial domain resource information of the uplink transmission and the association between the at least one piece of spatial domain resource information and the power control parameter; where the spatial domain resource information includes at least one type of CORESET information, TRP information, or PUCCH resource information.

An embodiment of the present application provides a power control method. The method includes an association between at least one piece of spatial domain resource information and a power control parameter is configured; DCI is sent to schedule an uplink transmission; and the uplink transmission is received; where the spatial domain resource information includes at least one type of CORESET information, TRP information, or PUCCH resource information.

An embodiment of the present application provides a power control apparatus. The power control apparatus includes an association relationship acquisition module, a spatial domain resource information module and a power control parameter determination module.

The association relationship acquisition module is configured to acquire an association between at least one piece of spatial domain resource information and a power control parameter.

The spatial domain resource information module is configured to acquire spatial domain resource information of an uplink transmission. The power control parameter determination module is configured to determine a power control parameter of the uplink transmission according to the spatial domain resource information of the uplink transmission and the association between the at least one piece of spatial domain resource information and the power control parameter. The spatial domain resource information includes at least one type of CORESET information, TRP information, or PUCCH resource information.

An embodiment of the present application provides a power control apparatus. The power control apparatus includes an association relationship configuration module, an uplink transmission scheduling module and an uplink transmission receiving module. The association relationship configuration module is configured to configure an association between at least one piece of spatial domain resource information and a power control parameter. The uplink transmission scheduling module is configured to send DCI to schedule an uplink transmission. The uplink transmission receiving module is configured to receive the uplink transmission. The spatial domain resource information includes at least one type of CORESET information, TRP information, or PUCCH resource information.

An embodiment of the present application provides a power control system. The power control system includes a terminal and a base station. The terminal includes any one of the power control apparatuses on the terminal side in the embodiments of the present application. The base station includes any one of the power control apparatuses on the base station side in the embodiments of the present application.

An embodiment of the present application provides a storage medium. The storage medium stores a computer program. When the computer program is executed by a processor, any one of the power control methods in the embodiments of the present application is implemented.

DETAILED DESCRIPTION

Hereinafter, embodiments of the present application will be described in detail in conjunction with the accompanying drawings.

A beam is an effective means for improving the transmission distance and avoiding interference in high-frequency-band communication, and the beam has directivity and width. In order to cover different directions, a sending terminal and a receiving terminal are generally provided with a multi-antenna to form beams in multiple directions.

The multi-antenna of a wireless communication node may be divided into different groups, each group is referred to as an antenna panel, also called an antenna panel, or a panel for short. A UE may generally support multiple antenna panels, covering different directions, respectively. Different antenna panels may generally send beams at the same time. One beam to multiple beams may be sent simultaneously on each antenna panel. A number of beams that may be simultaneously sent on each antenna panel is less than a maximum number of beams that may be supported by that antenna panel.

Figure 1:
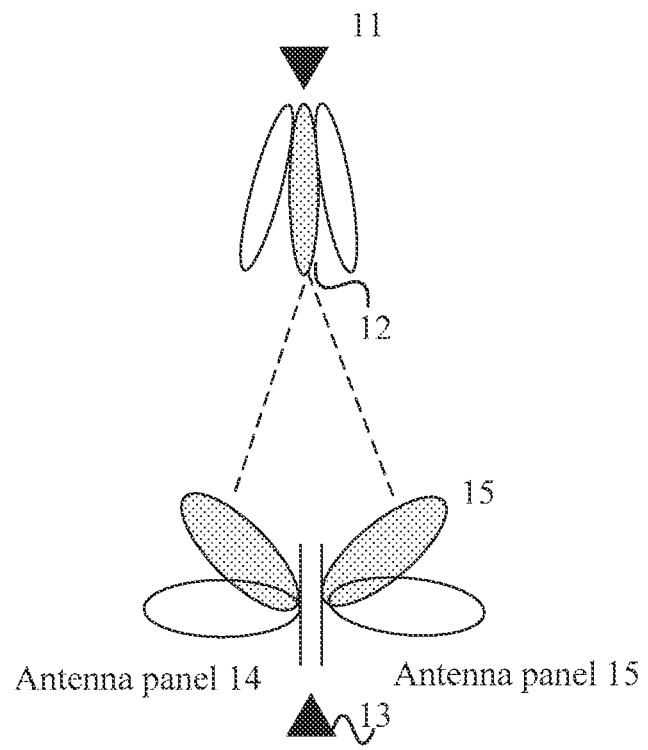
FIG. 1 is a diagram showing beams of a base station communicating with a UE configured with a multi-antenna provided in an embodiment.

A base station may also support multiple antenna panels, but antenna panel information of the base station is transparent to the UE. FIG. 1 is a diagram showing beams of a base station communicating with a UE configured with a multi-antenna provided in an embodiment. One beam 12 of three beams of the base station 11 shown in FIG. 1 is in communication with two antenna panels 14, 15 of the UE 13, and each of the antenna panels 14, 15 has one beam in communication with a beam of the base station.

A power control mechanism for a multi-beam is that a power control parameter of an uplink transmission is configured for the UE by the base station and is configured in following manner.

1) The base station configures J sets of open-loop power control parameters for the UE, each set of open-loop power control parameters include at least one of a target receiving power P0 or a path loss compensation factor alpha. Where J is an integer greater than or equal to 1, each set of open-loop power control parameters are identified by j, j is an integer, and 0≤j<J.

2) The base station configures K sets of path loss measurement parameters for the UE, each set of path loss measurement parameters include at least one of at least one reference signal (RS) resource type indicator for a path loss measurement or a reference signal (RS) resource indicator for a path loss measurement. Where K is an integer greater than or equal to 1, each set of path loss measurement parameters are identified by k, k is an integer, and 0≤k<K. The path loss measurement parameter, also written as a PL-RS parameter, is an indicator of a reference signal (RS) used for estimating the pathloss, and the path loss measurement parameter includes at least one of a CRT-RS indicator or a synchronization signal block (SSB) indicator. The SSB may also represent a synchronization signal block or a physical broadcast channel block (SS block or PBCH Block) consisting of a primary synchronization signal (PSS), a secondary synchronization signal (SSS), a demodulation reference signal (DM-RS) of a physical broadcast channel (PBCH).

3) The base station configures L sets of closed-loop power control parameters for the UE, each set of closed-loop power control parameters include at least one of a closed-loop power control identifier or a closed-loop power control number. Where L is an integer greater than or equal to 1, each set of closed-loop power control parameters are identified by l, l is an integer, and 0≤l<L.

The uplink transmission of the UE includes at least one of a physical uplink shared channel (PUSCH) transmission, or a physical uplink control channel (PUCCH) transmission. The base station configures at least one sounding reference signal (SRS) resource set for the UE, and each SRS resource set includes at least one SRS resource. Each SRS resource indicates resources occupied by the SRS, including parameters such as a time domain, a frequency domain, a code domain and a spatial domain.

The base station configures an association relationship between at least one SRS resource indicator (SRI) value of the PUSCH and a power control parameter. For example, when SRI=0, j=0, k=1, l=0; when SRI=1, j=1, k=1, and l=0. A value of each SRI represents at least one SRS resource. When the base station schedules a PUSCH transmission by using downlink control information (DCI), a SRI domain is used for describing a spatial domain parameter of the PUSCH, such as space relationship information, a SRS port. A SRI indicating multiple beams is referred to as a composite beam SRI; a SRI indicating a single beam is referred to as a single beam SRI.

The PUSCH transmission may be dynamically scheduled by uplink grant (UL grant) information included in the DCI, or may be semi-statically scheduled. A dynamic scheduling is referred to as a dynamic grant based transmission; a semi-persistent scheduling is referred to as a grant free transmission and also as a configured grant transmission. The configured grant transmission is divided into two categories. For a transmission of a type 1, all grant information is configured by high-layer signaling; for a transmission of a type 2, part of the grant information is configured by high-layer signaling, and also part of the grant information is sent through physical layer control signaling DCI, which is valid for several transmissions.

For a PUSCH transmission based on a dynamic grant, a power control parameter of the PUSCH transmission may be obtained by scheduling a SRI domain in DCI of the transmission to look up an association relationship between a SRI value and a power control parameter. For a PUSCH transmission configured with the grant, the open-loop power control parameter and the closed-loop power control parameter are configured through the high-layer signaling. A path loss measurement parameter for a PUSCH transmission of a configuration grant of a type 1 is configured by the high-layer signaling. A path loss measurement parameter of a PUSCH transmission of a configuration grant of a type 2 may be obtained by activating a SRI domain in the DCI of a current PUSCH transmission to look up an association relationship between a SRI value and a power control parameter.

The base station configures at least one space relationship of the PUCCH and configures an association relationship between the space relationship and the power control parameter. For example, j=0, k=1, l=0 is configured for a space relationship 1; j=1, k=1, l=0 is configured for a space relationship 2. The base station activates a space relationship corresponding to a PUCCH resource through a media access control address control element (MAC CE). The transmission of the PUCCH is triggered by the DCI in which a PUCCH resource used by a PUCCH transmission is indicated. By combining the above two, the UE may obtain a space relationship of the PUCCH transmission, and the power control parameter of the PUCCH transmission may be obtained by querying an association relationship between the space relationship and the power control parameter by using the space relationship. The space relationship may be indicated by an uplink reference signal and/or a downlink reference signal. The reference signal indicator is a reference signal resource indicator. The reference signal includes at least one of: a SRS, a channel status information-reference signal (CSI-RS), or a SSB. The closed-loop power control parameter refers to the closed-loop power control number, for example, if the closed-loop power control number is 2, then two closed-loop power control processes of l=0 and l=1 are supported, or the closed-loop power control process is called a closed-loop power control loop, or a closed-loop power control for short.

Each uplink transmission has one determined closed-loop power control identifier. The base station determines a power deviation required to be adjusted by the UE according to a difference between a historical uplink transmission measurement result and a target, and notifies the UE in a manner of transmitting a power control command (TPC Command) (namely, $\delta_{PUSCH}$ of a PUSCH and $\delta_{PUCCH}$ of a PUCCH in the DCI). The UE maintains a local power adjustment amount f(l) for each closed-loop power control identifier, and updates the local power adjustment amount f(l) according to a TPC command to achieve the purpose of the closed-loop power control.

In a mobile communication network in which a simultaneous transmission of multiple beams at a UE side is supported, as shown in FIG. 1, the UE includes two panels, and two beams from different panels communicate with one beam of a base station. Two simultaneously sent beams of the UE are described by one value of the SRI domain in the DCI and correspond to one set of power control parameters. That is, the base station configures one PL-RS for multiple beams sent simultaneously. The UE measures the PL-RS, and multiple beams which are sent simultaneously may measure the PL-RS, so that multiple path loss measurement results may be obtained. The implementation of the UE decides how to derive one path loss from multiple path losses. The UE calculates a sending power value for multiple beams sent at the same time, and equally divides the power according to the beams or the ports.

Figure 2:
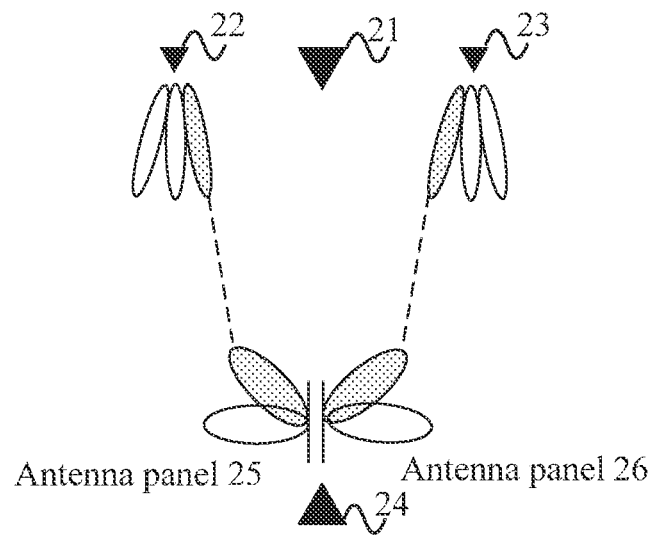
FIG. 2 is a diagram showing beams of abase station communicating with a UE in a multi-TRP scenario provided in an embodiment.

In a new generation of mobile communication networks, in order to implement a multi-TRP configuration at a base station side, each TRP may include at least one antenna panel, and in an actual deployment, geographic positions of multiple TRPs of the base station may be located far away from each other, and channel environments faced by each TRP may be different for a multi-TRP scenario of the base station. As shown in FIG. 2, FIG. 2 is a diagram showing beams of a base station communicating with a UE in a multi-TRP scenario provided in an embodiment. When the base station 21 configures two TRPs 22 and 23, different TRPs communicate with the two antenna panels 25, 26 of the UE 24, respectively. Because the TRP 22 and the TRP 23 are disposed at different locations, they may be subject to different interference and may have different sending power requirements for each link. For a downlink signal sent by the base station, all power control manners are controlled by the base station itself, but for an uplink signal sent by the UE, a scheduling of various resources is indicated by downlink control information sent by the base station. In a case where the base station supports the multi-TRP scenario, the base station may also have different requirements on a sending power of beams used by the UE to communicate with different TRPs.

For the PUSCH transmission, for the multi-TRP scenario, a PUSCH transmission corresponding to a TRP should be independently power controlled. Assuming that a current power control mechanism supports multiple TRPs, a SRI associated with the PUSCH transmission only has one set of numberings, a correspondence between the SRI numbering and the TRPs is known by the base station, and the base station configures a mapping relation between the SRI and the power control parameter, accordingly. That is, neither the SRI nor the power control parameter is explicitly associated with the TRP. For example, there is only one set of numberings for the SRI associated with the PUSCH transmission, i.e., there is only one SRS resource set corresponding to the PUSCH transmission. When the PUSCH transmission is a codebook based (CB) PUSCH transmission, the SRS resource set corresponding to one CB may be determined; when the PUSCH transmission is a non-codebook based PUSCH transmission, a SRS resource set corresponding to one NCB may be determined. However, a current implementation manner has following problems that a number of configurations of open-loop power control parameters, closed-loop power control parameters and path loss measurement parameters are limited, and especially a maximum number of closed-loops is only 2. If two TRPs are supported, and each TRP may only be configured with 1 closed-loop, then each TRP cannot support two closed-loops, so that an independent configuration of a closed-loop power control for a grant based PUSCH and a grant free PUSCH cannot be achieved, and an independent configuration of a closed-loop power control for two parallel beam pair links cannot be achieved.

For the PUCCH transmission, for the multi-TRP scenario, a PUCCH transmission corresponding to a TRP should be independently power controlled. Assuming that a current power control mechanism supports multiple TRPs, a space relationship associated with the PUCCH transmission only has one set of numberings, a correspondence between the space relationship numberings and the TRPs is known by the base station, and the base station configures a mapping relationship between the space relationship and the power control parameter, accordingly. That is, neither the space relationship nor the power control parameter is explicitly associated with the TRP. For example, the space relationship associated with the PUCCH transmission has only one set of numberings, including that there may be more than one PUCCH resource set corresponding to the PUCCH transmission, but for one PUCCH transmission, one PUCCH resource set may be determined according to its payload size. The PUCCH resource set includes at least one PUCCH resource. A high-level parameter further configures an association relationship between a possible space relationship of the PUCCH resource and a power control parameter. The method includes following: a PUCCH resource indicator is acquired according to DCI triggering the PUCCH transmission, and a power control parameter is obtained in the space relationship of the PUCCH resource according to a space relationship of a PUCCH resource activated by a media access control (MAC) layer parameter. However, a current implementation manner has following problems that a number of configurations of open-loop power control parameters, closed-loop power control parameters and path loss measurement parameters are limited, and especially a maximum number of closed-loops is only 2. If two TRPs are supported, and each TRP may only be configured with 1 closed-loop, then each TRP cannot support two closed-loops, so that an independent configuration of a closed-loop power control of the PUCCH for two beam pair links on one TRP cannot be achieved.

In summary, multiple limitations exist in the uplink transmission power control of the UE in a multi-TRP scenario.

Figure 3:
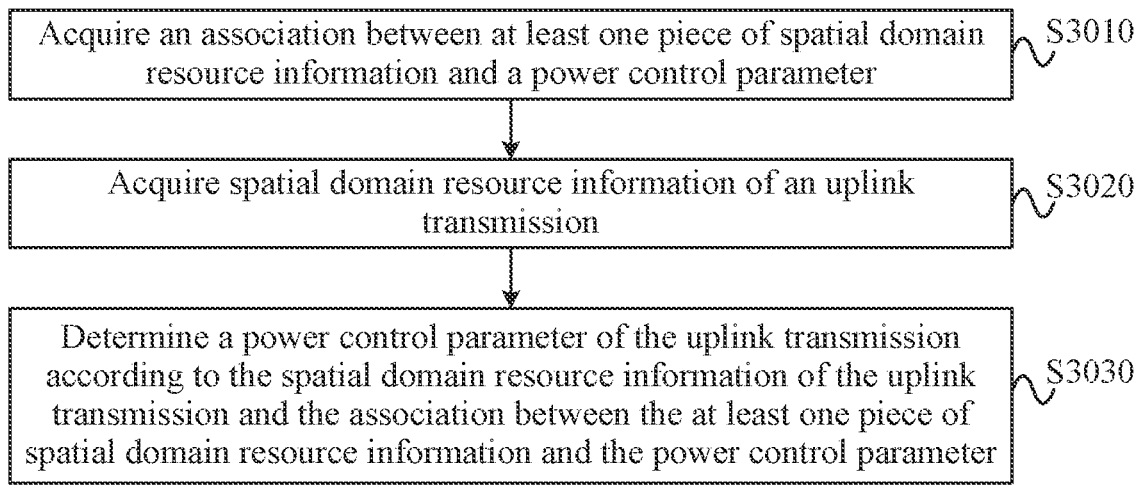
FIG. 3 is a flowchart of a power control method provided in an embodiment.

FIG. 3 is a flowchart of a power control method provided in an embodiment. As shown in FIG. 3, the method provided in this embodiment includes following.

In S3010, an association between at least one piece of spatial domain resource information and a power control parameter is acquired.

The power control method provided in this embodiment is applied to a user side terminal equipment in a wireless communication system, namely UE for short. The UE uses an uplink channel for an uplink transmission in a wireless communication system. When the UE performs the uplink transmission, a base station equipment at a network side needs to be requested to distribute transmission resources. After the base station distributes the transmission resources for the UE, spatial domain resource information occupied by the distributed transmission resources in the transmission space is also determined. Therefore, in order to realize the power control of the uplink transmission of the UE, the power control parameter may be associated with the spatial domain resource information. Space resources occupied by the UE uplink transmission may be described in multiple dimensions, which correspond to the same or different uplink transmissions by the UE, and when space resources used by the UE are determined, corresponding power control parameters should be determined. Thus, one power control parameter may be associated with one or more pieces of spatial domain resource information. The association between the at least one piece of spatial domain resource information and the power control parameter is pre-configured or configured by the base station. Through the determined one or more piece of spatial domain resource information, an associated power control parameter may be determined. The association between the at least one piece of spatial domain resource information and the power control parameter may be that each piece of spatial domain resource information is associated with the power control parameter, or may be that one or more pieces of spatial domain resource information are directly associated with the power control parameter, and other pieces of spatial domain resource information are associated with the associated spatial domain resource information, that is, are indirectly associated with the power control parameter.

The spatial domain resource information includes at least one of control resource set (CORESET) information, TRP information or PUCCH resource information. The CORESET indicates allocation of frequency domain resources and time domain resources, and the base station allocates at least one CORESET for the UE. The TRP information represents identifier information of a TRP used by the base station in a multi-TRP scenario. The PUCCH resource information is used for indicating a transmission resource used by the UE for transmitting the PUCCH. The UE acquires an association between one or more types of spatial domain resource information among several types of spatial domain resource information described above and the power control parameter.

The spatial domain resource information further includes at least one of space relationship information or reference signal information.

The space relationship information is used for transmission of a PUCCH. The reference signal information includes configuration information of a reference signal.

If spatial domain resource information in the association between the at least one piece of spatial domain resource information acquired by the UE and the power control parameter includes at least two types of the CORESET information, the TRP information, the PUCCH resource information, the space relationship information, or the reference signal information, the at least two types of the CORESET information, the TRP information, the PUCCH resource information, the space relationship information, or the reference signal information have an association relationship. Since the association between the at least one piece of spatial domain resource information and the power control parameter may only be an association between one type of spatial domain resource information and the power control parameter, after the UE acquires any one of the at least one piece of spatial domain resource information, a power control parameter of the uplink transmission may directly or indirectly determined according to an association relationship between the acquired at least two types of spatial domain resource information.

For example, the spatial domain resource information includes the CORESET information, the reference signal information, and the base station may configure an association between the reference signal information and the power control parameter for the UE. For example, the base station configures an association between at least one SRI and the power control parameter for a PUSCH transmission of the UE, and the SRI and CORESET information have an association relationship. A CORESET to which an uplink transmission-related DCI belongs may be used for determine a meaning of the SRI. If one SRS resource set includes two SRS resources, each SRS resource is associated with one CORESET, then a PUSCH scheduled by DCI detected on a first CORESET corresponds to a first SRS resource; a PUSCH scheduled by DCI detected on a second CORESET corresponds to a second SRS resource.

Furthermore, different CORESETs correspond to different association relationships between the SRI and the power control parameter. The UE determines to use the association relationship between the SRI corresponding to the CORESET and the power control parameter according to a CORESET to which DCI related to the uplink transmission belongs.

Alternatively, the SRS resource set has an association relationship with the CORESET information. At least one SRS resource is included in one SRS resource set. A PUSCH scheduled by DCI detected on a first CORESET corresponds to a first SRS resource; a PUSCH scheduled by DCI detected on a second CORESET corresponds to a second SRS resource. A SRI field included in the DCI has a correspondence with a SRS resource included in the SRS resource set associated with a CORESET to which the DCI belongs.

Furthermore, different CORESETs correspond to different association relationships between the SRI and the power control parameter. The UE determines to use the association relationship between the SRI corresponding to the CORESET and the power control parameter according to a CORESET to which DCI related to the uplink transmission belongs.

The CORESET information includes one of a CORESET, a CORESET group, a CORESET index, or a CORESET group index. The TRP information includes one of a TRP, a TRP group, a TRP index and a TRP group index; the PUCCH resource information includes one of a PUCCH resource, a PUCCH resource group, a PUCCH resource index or a PUCCH resource group index; the space relationship information includes at least one piece of reference signal information; and the reference signal information includes one of a reference signal, a reference signal resource, a reference signal resource set, a reference signal resource grouping, a reference signal index, a reference signal resource index, a reference signal resource set index, or a reference signal resource grouping index.

The index described above is also referred to as a numbering, an indicator or an identifier. The reference signal may be an uplink reference signal or a downlink reference signal. The uplink reference signal includes one of the SRS, a demodulation reference signal (DMRS), a phase tracking reference signal (PTRS), and a tracking reference signal (TRS). The downlink reference signal includes one of a CSI-RS, a SSB, a DMRS, a PTRS, or a TRS.

At least one reference signal resource is included in a reference signal resource set. For example, at least one SRS resource is included in a SRS resource set. The reference signal resource grouping (RS resource grouping) includes at least one combination of reference signal resources, and each combination of reference signal resources includes at least one reference signal resource. For example, there are 15 different combinations of 4 SRS resources at most, which are indicated by different SRS Resource indicators (SRIs).

For example, the base station configures an SRS resource set for a non-codebook based transmission of the UE, where the SRS resource set includes 4 SRS resources, which are SRS1 to SRS 4, respectively. When SRI information is used to indicate SRS resources to be used in the DCI, there are at most 15 combination manners, which are: SRI0: SRS1; SRI1: SRS2; SRI2: SRS3; SRI3: SRS4; SRI4: SRS1 SRS2; SRI5: SRS1 SRS3; SRI6: SRS1 SRS4; SRI7: SRS2 SRS3; SRI8: SRS2 SRS4; SRI9: SRS3 SRS4; SRI10: SRS1 SRS2 SRS3; SRI11: SRS1 SRS2 SRS4; SRI12: SRS1 SRS3 SRS4; SRI13: SRS2 SRS3 SRS4; SRI14: SRS1 SRS2 SRS3 SRS4.

The association between the spatial domain resource information and the power control parameter may include an association of all types of the spatial domain resource information and the power control parameter; or one type of spatial domain resource information in the spatial domain resource information corresponds to at least one association including other types of spatial domain resource information and the power control parameter.

For example, if spatial domain resource information in an association of one piece of spatial domain resource information and the power control parameter includes the CORESET information and the reference signal information (e.g., SRI or space relationship), then the association of the one piece of spatial domain resource information and the power control parameter includes the CORESET information, the SRI (or space relationship), and the power control parameter. Or, an association between each SRI and the power control parameter is bound or associated with one piece of CORESET message. In a particular embodiment, one piece of CORESET information is included in the association between the each SRI (or space relationship) and the power control parameter, or an association between at least one SRI (or space relationship) and the power control parameter is configured for each CORESET information.

For another example, if spatial domain resource information in an association of one piece of spatial domain resource information and the power control parameter includes the TRP information and the reference signal information (e.g., SRI or space relationship), then the association of the one piece of spatial domain resource information and the power control parameter includes the TRP information, the SRI (or space relationship), and the power control parameter. Or, an association between each SRI (or space relationship) and the power control parameter is bound or associated with one piece of TRP information. In a particular embodiment, one piece of TRP information is included in the association between the each SRI (or space relationship) and the power control parameter, or an association between at least one SRI (or space relationship) and the power control parameter is configured for each TRP information.

The power control parameter includes at least one of an open-loop power control parameter, a closed-loop power control parameter, or a path loss measurement parameter. The open-loop power control parameter includes at least one of an open-loop power control parameter identifier, a target receiving power or a path loss factor. The path loss measurement parameter includes at least one of a path loss measurement parameter identifier, a reference signal resource type indication for a path loss measurement, or a reference signal resource indication for a path loss measurement; and the closed-loop power control parameter includes at least one of a closed-loop power control process identifier, or a number of closed-loop power control processes.

The step in which the association between the at least one piece of spatial domain resource information and the power control parameter is acquired includes: the association between the at least one piece of spatial domain resource information and the power control parameter is acquired according to one of following information: a power control parameter or a power control related parameter, where the power control parameter or the power control related parameter includes spatial domain resource information associated with the power control parameter; spatial domain resource information or a spatial domain resource information related parameter, where the spatial domain resource information or the spatial domain resource information related parameter includes a power control parameter associated with the spatial domain resource information; a power control related parameter, where the power control related parameter includes at least one set of power control parameters, each set of power control parameters are associated with spatial domain resource information; an association of predefined spatial domain resource information with the power control parameter; or an association of configured spatial domain resource information with the power control parameter, where the power control related parameter includes the power control parameter, and the spatial domain resource information related parameter includes a spatial domain resource information parameter.

For example, assuming that the spatial domain resource information include the CORESET information. The base station configures the UE with two sets of power control parameters, i.e., PowerControlParas0 and PowerControlParas1 (identified by PowerControlParas-Id) associated with CORESET_Config0 and CORESET_Config1 (identified by Groupid), respectively.

An association between the spatial domain resource information, the CORESET information and the power control parameter is acquired according to one of following information:

1) a power control parameter or a power control related parameter, where the power control parameter includes spatial domain resource information associated with the power control parameter.

The power control parameter includes the spatial domain resource information associated with the power control parameter, for example, the CORESET information is added in a PowerControlParas parameter, i.e., a Power control parameter PowerControlParas: {GroupId, ... }. Specifically, the base station configures following power control parameters to the UE, such as a PowerControlParas0: {group0, . . . }, a PowerControlParas1: {group1, . . . }.

The power control related parameter includes the spatial domain resource information associated with the power control parameter. The power control related parameter, such as a config, includes the power control parameter. The power control related parameter may be understood as upper layer or multi-layer signaling structures including the power control parameter.

If the power control related parameter includes the spatial domain resource information GroupId associated with the power control parameter, then the power control related parameter includes at least one power control parameter.

The UE acquires the above information and may obtain an association between the power control parameter PowerControlParas and the CORESET information.

The power control parameter is a high-layer parameter that is one of a PUSCH-PowerControl, a pucch-PowerControl, or a BWP-UplinkDedicated; and the power control related parameter may be a high-layer parameter that is one of a PUSCH-Config or a PUCCH-Config.

If the CORESET information GroupId is included in the power control parameter PUSCH-PowerControl, it is written in ASN.1 format as:

```
PUSCH-PowerControl ::=      SEQUENCE {
...
pusch-PowerControl-Id       pusch-PowerControl-Id
GroupId                     GroupId
...
}.
```

The power control related parameter is a signaling structure containing the power control parameter PUSCH-PowerControl, assuming that it is PUSCH-Config, which includes at least one power control parameter PUSCH-PowerControl, there are two manners, a manner 1, the PUSCH-Config supports configuring multiple power control parameters PUSCH-PowerControl at once, as shown below:

```
PUSCH-Config ::=SEQUENCE {
...
pusch-PowerControl          SEQUENCE(SIZE (1..maxNrofpusch-PowerControl))
OF pusch-PowerControl
...
}.
```

A manner 2, the PUSCH-Config supports multiple power control parameters PUSCH-PowerControl in an addmode-release manner, as shown below:

```
PUSCH-Config ::=              SEQUENCE {
...
  pusch-PowerControlToAddModList    SEQUENCE (SIZE
(1..maxNrofpusch-PowerControl)) OF pusch-PowerControl
  pusch-PowerControlToReleaseList  SEQUENCE (SIZE (1..maxNrofpusch-
                                    PowerControl))
OF pusch-PowerControl-Id
...
}.
```

The base station configures at least one pusch-PowerControl for the UE, and each pusch-PowerControl is identified by a pusch-PowerControl-Id. A maximum number of supports is maxNrofpusch-PowerControl.

There is a similar implementation for the PUCCH, but the PUSCH in the above structure is replaced with the PUCCH, which is not repeated again. In addition to the above manner, the power control parameter may not have the Groupid, and the GroupId is carried in the power control related parameter, then at least one power control related parameter carrying the Groupid may be included in upper layer or multi-layer signaling structures carrying the power control related parameter of the GroupId. The manner to include at least one power control related parameter carrying the GroupId may be: multiple power control related parameters are supported to be configured at once, or multiple power control related parameters are supported in an addmode-release manner.

If the power control related parameter does not include the spatial domain resource information GroupId associated with the power control parameter, then the power control related parameter includes at least one power control parameter, and the spatial domain resource information GroupId is associated for each power control parameter. The spatial domain resource information Groupid being configured for the each power control parameter may be one of following manners:

A, each power control related parameter includes a spatial domain resource information GroupId and a corresponding power control parameter;

For example: config: {PowerControlParas, GroupId, . . . }.

Specifically, the base station configures following power control related parameters to the UE, such as:

```
config0: {
PowerControlParas0,
group0,
...
};
config1: {
PowerControlParas1,
group1,
```

-continued

```
    ...
}
```

B, the power control related parameter include at least one piece of spatial domain resource information GroupId and power control parameters corresponding to the at least one piece of spatial domain resource information GroupId;

Specifically, the base station configures following power control related parameters to the UE, such as:

```
config: {
    Group #1: {
        PowerControlParas0,
        GroupId,
        ...
    }
    Group #2: {
        PowerControlParas1,
        GroupId,
        ...
    }
}
```

C, the power control related parameter includes at least one power control parameter, and each power control parameter corresponds to one piece of spatial domain resource information GroupId, respectively; i.e. the GroupId is not carried directly.

Specifically, the base station configures following power control related parameters to the UE, such as:

```
config: {
    PowerControlParasforGroup0    PowerControlParas0
    PowerControlParasforGroup1    PowerControlParas1
    ...
}
```

For example, the pusch-PowerControl may not carry the GroupId.

```
PUSCH-Config ::=              SEQUENCE {
    ...
    pusch-PowerControlforGroup0    pusch-PowerControl
    pusch-PowerControlforGroup1    pusch-PowerControl
    ...
}
```

As another example, upper layer or multi-layer signaling structures, BWP-UplinkDedicated, of the power control related parameter include multiple PUSCH-Configs, each corresponding to different GroupIds. Then the parameters of the PUSCH-Config and its lower layers may not include the GroupId.

```
BWP-UplinkDedicated ::=    SEQUENCE {
    ...
    pusch-ConfigforGroup0    SetupRelease { PUSCH-Config }
    pusch-ConfigforGroup1    SetupRelease { PUSCH-Config }
    ...
}
```

The example herein is given only for part of parameters related to the PUSCH transmission, and other transmissions, such as a PUCCH transmission, may have similar examples. Such as:

The power control parameter PUCCH-PowerControl includes the GroupId.

```
PUCCH-PowerControl ::=        SEQUENCE {
    PUCCH-PowerControl-Id
    GroupId
    ...
}
```

Assuming that the parameter containing the PUCCH-PowerControl is the PUCCH-Config, then the base station may configure at least one PUCCH-PowerControl for the UE to correspond to different TRP information and/or CORESET information, respectively.

In addition, the parameter PUCCH-Config containing the PUCCH-PowerControl may also include at least one PUCCH-PowerControl, each PUCCH-PowerControl corresponds to one piece of TRP information and/or CORESET information, as shown below. Where spatialRelationInfo is the space relationship of the PUCCH transmission.

```
PUCCH-Config ::=              SEQUENCE {
    ...
    Group 0{
        spatialRelationInfo
        pucch-PowerControl
    }
    Group 1{
        spatialRelationInfo
        pucch-PowerControl
    }
    ...
}
```

Since the PUCCH-PowerControl is included in the PUCCH-Config, it is also possible to configure the PUCCH-Config for different TRP information and/or CORESET information between upper layer parameters of the PUCCH-Config, as shown below:

```
BWP-UplinkDedicated ::=    SEQUENCE {
    pucch-Config1              SetupRelease { PUCCH-Config }
    pucch-Config2              SetupRelease { PUCCH-Config }
    ...
}
```

2) Spatial domain resource information or spatial domain resource information related parameter, where the spatial domain resource information or the spatial domain resource information related parameter includes a power control parameter associated with the spatial domain resource information;

For example, the PowerControlParas parameter is included in the CORESET information, i.e., CORESET_Config:{PowerControlParas-Id, . . . }. Specifically, the base station configures following parameters to the UE, i.e., CORESET_Config0:{PowerControlParas0, . . . }, CORESET_Config1:{PowerControlParas1, . . . }.

The spatial domain resource information related parameter may be understood as upper layer or multi-layer signaling structures including the spatial domain resource information parameter, such as config: {CORESET Config, Group-Id, . . . }. Specifically, the base station configures following power control related parameters to the UE, such as config0: {CORESET Config0, group0, . . . }; config1: {CORESET_Config1, group1, . . . }. For example, when the spatial domain resource information is a space relationship, for a PUCCH transmission, its spatial domain resource information parameter is assumed to be PUCCH-SpatialRelationInfo, and its corresponding power control parameter is included in the spatial domain resource information parameter, such as:

```
PUCCH-SpatialRelationInfo ::=    SEQUENCE {
    PowerControlParas
    ...
}
```

In addition, the spatial domain resource information for non-TRP information or CORESET information may also be associated with TRP information and/or CORESET information (identified with GroupId). As shown below, the PUCCH-SpatialRelationInfo needs to include the GroupId:

```
PUCCH-SpatialRelationInfo ::=    SEQUENCE {
    GroupId
    ...
}
```

For the PUSCH transmission, the spatial domain resource information may be reference signal information, such as a SRI, or a SRS resource, or a SRS resource set.
For example:

```
SRS-Config ::=    SEQUENCE {
    GroupId
    ...
}
Or,
SRS-ResourceSet ::=    SEQUENCE {
    GroupId
    ...
}
Or,
SRS-Resource ::=    SEQUENCE {
    GroupId
    ...
}
```

Similarly, it is exemplified above that the spatial domain resource information may include the GroupId.

The spatial domain resource information may also not contain the Groupid, and a relation between the spatial domain resource information parameter and the TRP information and/or the CORESET information is indicated in the parameter of the upper layer thereof, i.e., the spatial domain resource information related parameter including the spatial domain resource information parameter.

3) A power control related parameter, where the power control related parameter includes at least one set of power control parameters, and each set of power control parameters are associated with the spatial domain resource information;

If the CORESET information GroupId is not included in the power control parameter PUSCH-PowerControl, it is written in ASN.1 format as:

```
PUSCH-PowerControl ::=    SEQUENCE {
    ...
    pusch-PowerControl-Id    pusch-PowerControl-Id
    ....
}.
```

The power control related parameter is a signaling structure containing the power control parameter PUSCH-PowerControl, assuming that it is PUSCH-Config, which includes at least one power control parameter PUSCH-PowerControl, as shown below:

```
PUSCH-Config ::=    SEQUENCE {
    ...
    pusch-PowerControl    SEQUENCE (SIZE (1..maxNrofpusch-
    PowerControl)) OF {
    Group-Id    Group-Id
    pusch-PowerControl    push-PowerControl
    }
    ...
}...
```

4) An association of predefined spatial domain resource information and power control parameters;

The association of the predefined spatial domain resource information and the power control parameter means that the base station configures at least one set of power control parameters for the UE and configures CORESET information with the same number as the set number of the power control parameter, and the power control parameter and the CORESET information are associated according to the serial number sequence. The PowerControlParas0 is associated with the group0, the PowerControlParas1 is associated with the group1, and so on.

If the CORESET information GroupId is not included in the power control parameter PUSCH-PowerControl, it is written in ASN.1 format as:

```
PUSCH-PowerControl ::=    SEQUENCE {
    ...
    pusch-PowerControl-Id    pusch-PowerControl-Id
    ...
}
```

The power control related parameter is a signaling structure containing the power control parameter PUSCH-PowerControl, assumed that it is PUSCH-Config, which includes at least one power control parameter PUSCH-PowerControl, as shown below:

```
PUSCH-Config ::=    SEQUENCE {
    ...
    pusch-PowerControl    SEQUENCE (SIZE
    (1..maxNrofpusch-
    PowerControl)) OF
    pusch-PowerControl
    ...
}
```

The multiple pusch-PowerControls correspond to the GroupId of the CORESET information in a predefined manner.

5) An associating between configured spatial domain resource information and the power control parameter.

The association between the configured spatial domain resource information and the power control parameter means that the base station configures at least one set of power control parameters for the UE and configures at least one set of CORESET information, and an association relationship between the power control parameter and the CORESET information is configured by the base station. For example: Mapping: {Mapping-Id, PowerControlParas-Id, Group-ID}. Further, Mapping0: {PowerControlParas0, group1} denotes PowerControlParas0 associated group1, Mapping1: {PowerControlParas1, group0} denotes PowerControlParas1 associated group0, etc.

In S3020, spatial domain resource information of an uplink transmission is acquired.

The UE uses an uplink channel to perform an uplink transmission when performing a data transmission in a wireless communication system, and different space resources need to be used when the UE needs to perform different types of uplink transmissions. A space resource used by the UE for the uplink transmission is scheduled by the base station, and when the UE determines an uplink transmission to be performed, corresponding spatial domain resource information may be obtained from the base station.

The spatial domain resource information used by the UE for the uplink transmission is generally scheduled by the base station, and the base station sends DCI to the UE, and the DCI is used for scheduling the uplink transmission of the UE. Since the DCI is a type of control information, the DCI is transmitted on a resource determined by the CORESET, then the UE may determine the CORESET to which the DCI belongs after receiving the DCI. Then, the UE may acquire the CORESET information in the spatial domain resource information through the determined CORESET. Or the UE may also acquire the TRP information in the space resource according to the CORESET to which the received DCI belongs, where the TRP information is associated with the CORESET information. Alternatively, the UE may also acquire the CORESET information and the TRP information in the space resource at the same time according to the CORESET to which the received DCI belongs. Alternatively, the UE may acquire CORESET information and/or TRP information configured for the uplink transmission.

The DCI related to the uplink transmission includes one of: a scheduling of the DCI of the uplink transmission, an activating of the DCI of the uplink transmission, or the DCI responded by the uplink transmission.

The uplink transmission includes one of: a PUSCH transmission, a PUCCH transmission, or a SRS transmission. That is, the power control method provided in this embodiment may perform an independent and flexible power control on various uplink transmissions of the UE.

For example, a grant based PUSCH transmission is scheduled by one piece of DCI that contains scheduling information for this PUSCH transmission. The scheduling information is also called authorization information and grant information. For a grant based PUSCH transmission, its spatial domain resource information is determined by the CORESET where the DCI scheduling the PUSCH transmission is located. Specifically, the UE only detects DCI at time-frequency domain positions configured by the base station, and the time-frequency domain positions are configured to the UE in a CORESET and search space manner. Therefore, when the UE detects the DCI, the UE may determine the CORESET corresponding to the DCI. Since the CORESET is bound with the TRP, or the CORESET and the TRP have an association relationship, the UE may determine the CORESET information or the TRP information of the PUSCH transmission scheduled by the DCI when detecting the DCI.

For a PUSCH transmission for which a grant type 2 is configured, one piece of DCI being activated is required in addition to a high-layer configured parameter. CORESET information or TRP information of a PUSCH transmission activated by the DCI may be determined according to the CORESET to which the DCI activating the PUSCH transmission belongs.

For a PUCCH transmission, transmission-related downlink control information refers to the downlink control information to which the uplink transmission responds. The PUCCH includes response information for a downlink transmission, and the DCI for scheduling the downlink transmission is downlink control information related to the PUCCH transmission or called downlink control information responded by the PUCCH transmission. The CORESET information or TRP information of the PUCCH transmission may be determined according to the CORESET to which the downlink control information responded by the PUCCH transmission belongs.

In S3030, a power control parameter of the uplink transmission is determined according to the spatial domain resource information of the uplink transmission and the association between the at least one piece of spatial domain resource information and the power control parameter.

When the UE determines the spatial domain resource information of the uplink transmission, that is, the UE may determine the power control parameter corresponding to the uplink transmission according to the association between at least one piece of spatial domain resource information and the power control parameter. The terminal uses the determined power control parameter to perform a power control on the uplink transmission, so that the power control on the uplink transmission is achieved. Because the power control parameter is associated with the spatial domain resource information in this embodiment, when the UE needs to perform the uplink transmission, a corresponding power control parameter may be determined according to the association relationship as long as the space resource used by the uplink transmission is determined, so that the power control of the uplink transmission is achieved. Even in a base station multi-TRP scene, since space resources used by the base station to communicate with the UE are different due to different TRPs, so that the UE may determine corresponding power control parameters according to space resources corresponding to different TRPs, namely, an independent power control in the multi-TRP scene is achieved.

In the power control method provided in this embodiment, the association between the at least one piece of spatial domain resource information and the power control parameter is acquired, and then the power control parameter of the uplink transmission is determined according to the spatial domain resource information of the uplink transmission and the association between the at least one spatial domain resource information and the power control parameter upon acquiring the spatial domain resource information of the uplink transmission. Because spatial domain resource information used by the UE for the uplink transmission in different scenes is different, the independent and flexible power control may be performed on the uplink transmission of the UE.

Figure 4:
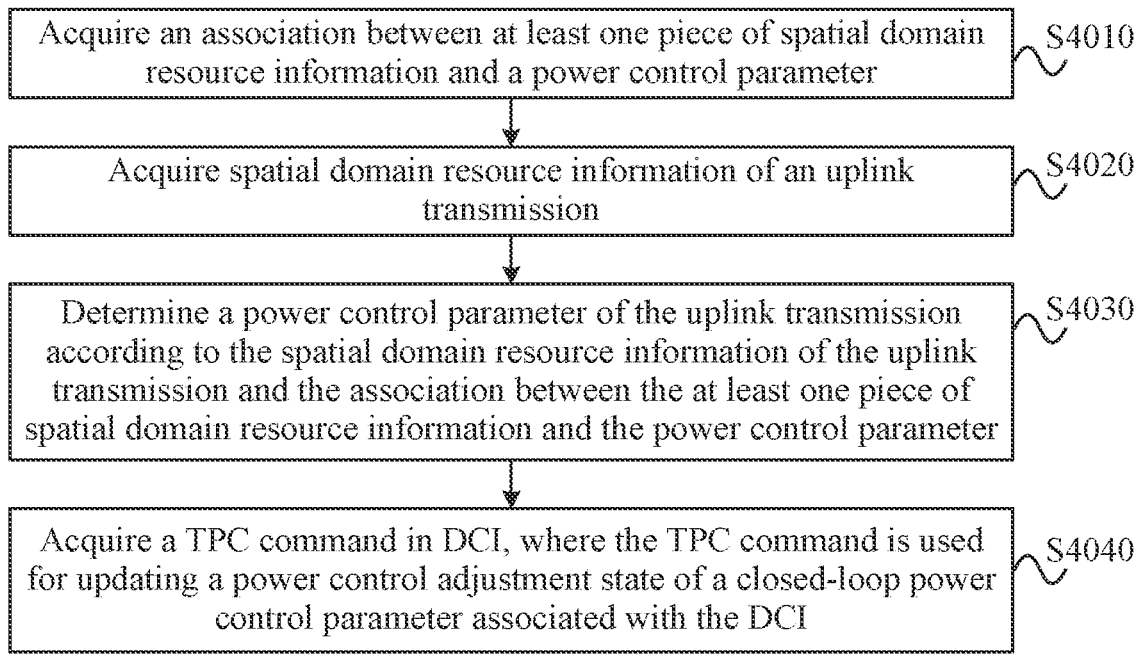
FIG. 4 is a flowchart of another power control method provided in an embodiment.

FIG. 4 is a flowchart of another power control method provided in an embodiment, as shown in FIG. 4, the method provided in this embodiment includes following.

In S4010, an association between at least one piece of spatial domain resource information and a power control parameter is acquired.

In S4020, spatial domain resource information of an uplink transmission is acquired.

In S4030, a power control parameter of the uplink transmission is determined according to the spatial domain resource information of the uplink transmission and the association between the at least one piece of spatial domain resource information and the power control parameter.

In S4040, a TPC command in DCI is acquired, where the TPC command is used for updating a power control adjustment state of a closed-loop power control parameter associated with the DCI.

The uplink transmission power control of the UE mainly includes two manners, i.e., an open-loop power control and a closed-loop power control, and enables a base station to obtain a path loss measurement parameter of a link state. The open-loop power control only needs to acquire an open-loop power control parameter once according to the association between the spatial domain resource information and the power control parameter. The closed-loop power control requires that the base station continuously sends a TPC command to the UE according to the path loss measurement parameter reported by the UE, and continuously adjusts the uplink transmission power of the UE, then the UE needs to acquire the TPC command in the received DCI. The TPC command determines a power deviation required to be adjusted by the UE according to a difference between a historical uplink transmission measurement result and target uplink transmission power.

The UE may determine a CORESET to which the DCI belongs according to the received DCI, and may directly or indirectly determine the associated power control parameter according to the CORESET. The UE may use the acquired TPC command to update a power control adjustment state of a closed-loop power control parameter associated with the DCI. Therefore, an independent closed-loop updating of the closed-loop power control parameters corresponding to different spatial domain resource information is achieved.

The closed-loop power control parameter associated with the DCI is determined by adopting following manners:
  the CORESET information and/or the TRP information is determined according to a CORESET to which the DCI belongs; and
  a closed-loop power control parameter in a power control parameter associated with the determined CORESET information and/or the determined TRP information is determined according to the determined CORESET information and/or the determined TRP information. The CORESET to which the DCI belongs is a CORESET to which a resource where the DCI information is located belongs.

In addition, in an embodiment, the TPC command corresponds to a same closed-loop power control parameter of a same group of uplink transmissions as the power control adjustment state of the closed-loop power control parameter; the same group of uplink transmissions have an association relationship with the CORESET information and/or the TRP information determined by the CORESET to which the DCI belongs.

For one type of uplink transmission, the base station configures at least one group of uplink transmission for the UE, and each group of uplink transmission is associated with one piece of CORESET information and/or TRP information.

The uplink transmission includes at least one of following types: a PUSCH transmission, a PUSCH transmission with a configuration grant, a PUCCH transmission, or a SRS transmission.

For example, for the PUSCH transmission, at least one group of PUSCH configuration information is included, each group of PUSCH configuration information is associated with one piece of CORESET information and/or TRP information.

For the PUSCH transmission with the configuration grant, at least one group of PUSCH configuration information with the configuration grant is included, and each group of PUSCH configuration information with the configuration grant is associated with one piece of CORESET information and/or TRP information.

For the PUCCH transmission, at least one group of PUCCH configuration information is included, and each group of PUCCH configuration information is associated with one piece of CORESET information and/or TRP information. Or, for the PUCCH transmission, configuration information of at least one group of PUCCH resources is included, and each group of PUCCH resource is associated with one piece of CORESET information and/or TRP information.

For the SRS transmission, at least one group of SRS configuration information is included, and each group of SRS configuration information is associated with one piece of CORESET information and/or TRP information. Or, for the SRS transmission, at least one group of SRS resource set configuration information is included, and each group of SRS resource set configuration information is associated with one piece of CORESET information and/or TRP information. Or, for the SRS transmission, at least one group of SRS resource configuration information is included, and each group of SRS resource configuration information is associated with one piece of CORESET information and/or TRP information.

For example: DCI format 0_0 and DCI format 0_1 are used for scheduling a PUSCH transmission, so that TPC commands included in these DCIs are used for updating the power control adjustment state of the closed-loop power control parameter of the PUSCH transmission.

DCI format 1_0 and DCI format 1_1 are used for scheduling the PDSCH transmission, so that TPC commands included in these DCIs are used for updating the power control adjustment state of the closed-loop power control parameter for the PUCCH transmission.

DCI format 2_2 is a TPC command for sending a PUSCH transmission or a PUCCH transmission, and is differentiated by different Cyclic Redundancy Check (CRC) scrambling manners. Then a TPC command included in DCI format 2_2 scrambled with TPC-PUSCH-RNTI is used for updating the power control adjustment state of the closed-loop power control parameter of the PUSCH transmission; and a TPC command included in the DCI format 2_2 scrambled with the TPC-PUCCH-RNTI is used for updating the power control adjustment state of the closed-loop power control parameter of the PUCCH transmission.

DCI format 2_3 is a TPC command for sending an SRS transmission, then a TPC command included in DCI format 2_3 is used for updating a power control adjustment state of a closed-loop power control parameter of a SRS transmission.

More than 1 closed-loop power control numbering may exist for a same type of uplink transmission, and a TPC command in the DCI may only be used for a power control adjustment state of a corresponding closed-loop power control numbering thereof. For example, if a PUSCH transmission scheduled by DCI 0_1 has a closed-loop power control numbering of 0, the TPC command therein is used for updating the power control adjustment state for the PUSCH transmission with the closed-loop power control numbering of 0.

The power control method provided in the embodiments of the present application is described in detail below for three different uplink transmissions, i.e., a PUSCH transmission, a PUCCH transmission, and a SRS transmission.

Firstly, for a case that the uplink transmission is the PUSCH transmission:

In an embodiment, the SRI associated with the PUSCH transmission has only one set of numberings, i.e., the PUSCH transmission has only one corresponding SRS resource set after it is determined that the PUSCH transmission is based on a codebook transmission or a non-codebook transmission. The SRS resource set includes at least one SRS resource, each SRS resource is associated with one TRP. This has the benefit that since the DCI may determine the TRP to which it belongs, the SRI in the DCI only needs to indicate the SRI associated with the TRP to which it belongs. The overhead indicating the SRI domain in the DCI may be reduced. When there is only one possible SRI in the DCI, a SRI domain may not exist, i.e. an association relationship of the DCI and the SRI is predetermined. Or, the association relationship between the DCI and the SRI is indirectly obtained through an association relationship between the DCI and the SRI and the TRP.

For example, an SRS resource set for a CB includes 2 SRS resources, each SRS resource corresponds to one TRP. Assuming that SRS resource 0 and SRS resource 1 correspond to TRP 0 and TRP 1, respectively, and CORESET 0 and CORESET 1 correspond to TRP 0 and TRP 1, respectively. A PIECE OF DCI sent through CORESET 0 is then associated with TRP 0 and, in turn, is associated with SRS resource 0. Since a piece of DCI may be indirectly associated onto an SRI, for one piece of DCI, its associated SRI has only one possibility, and the SRI field may not be present in the DCI.

In addition, for one PUSCH transmission, after a SRI associated with its associated DCI is determined, the power control parameter of the PUSCH transmission may be determined in one of following manners:

A manner a: an association relationship between the SRI and the power control parameter is configured by the base station; for example, radio resource control (RRC) signaling configures an association relationship between the SRI and the power control parameter, that is, each possible SRI corresponds to a determined group of power control parameters, including at least one of: an open-loop power control parameter, a closed-loop power control parameter or a path loss measurement parameter.

A manner b: an association relationship between the power control parameter and the TRP is configured, where the association relationship between the SRI and the power control parameter is indirectly obtained through an association relationship of the TRP. At least one of the open-loop power control parameter, the closed-loop power control parameter and the path loss measurement parameter has a pre-configured or pre-defined association relationship with the TRP. For example, the TRP 0 and the TRP 1 respectively correspond to a set of power control parameters, and the power control parameter includes at least one of an open-loop power control parameter, a closed-loop power control parameter or a path loss measurement parameter. If so, the SRI is determined, and the power control parameter is obtained through the TRP associated with the SRI.

In another embodiment, when the base station adopts a multi-TRP transmission scenario, higher flexibility is required in the power control of the UE, one of several manners may be employed as follows.

A manner 1, a power control mechanism in the related art is used, and an upper limit number of the power control parameter is expanded. For example, an upper limit of configured numbers of at least one of the open-loop power control parameter, the closed-loop power control parameter, or the path loss measurement parameter is increased by a multiple of a number of supported TRPs. For example, when a number of supported TRPs is 2, the upper limit of the closed-loop power control number is increased by 2 times from 2, i.e., to 4. In this way, the numberings 0, 1, 2 and 3 of the closed-loop power control may be configured to different TRPs, and independent power control of the different TRPs is achieved. For example, closed-loop power control of TRP 0 is numbered 0 and 1, and is used for supporting independent closed-loop power control of grant based PUSCH transmission and grant free PUSCH transmission, respectively, or is used for supporting two beam pair link independent closed-loop power control, respectively.

A manner 2: a closed-loop of different TRPs tends to be updated independently. In a case where the upper limit number of closed-loop power control parameters is not expanded, different TRPs are limited, and even if IDs of closed-loops are the same, TPC commands are independently used. For example, the closed-loop power control is maintained independently for different TRPs. That is, the TPC command carried in the DCI may only be used for updating the TPC command corresponding to the TRP associated with the DCI. For example, when the number of supported TRPs is 2, the upper limit of the closed-loop power control number is 2. The TPC command carried by the DCI sent in the CORESET 0 corresponding to the TRP 0 may only update the closed-loop power control corresponding to the TRP 0. The TPC command carried by the DCI sent in the CORESET 1 corresponding to the TRP 1 may only update the closed-loop power control corresponding to the TRP 1. This has the benefit that each TRP may support an independent maximum of 2 closed-loop power controls.

A manner 3: multiple SRS resource sets are configured for a PUSCH codebook or non-codebook transmission, each SRS resource set corresponds to 1 TRP, respectively. The TRP associated with the DCI may obtain the SRS resource set. The SRS resource set includes at least one SRS resource. The association between the SRS resource (indicated by the SRI in the DCI) and the power control parameter includes that the base station configures an association relationship between a corresponding group of SRIs and the power control parameter for each SRS resource set.

For example, for each SRS resource set, the RRC signaling configures an association relationship SRI-PUSCH-PowerControl between a group of SRIs and the power control parameter. For each SRS resource set, a group of SRI-PUSCH-PowerControls may include multiple SRI-PUSCH-PowerControls, which respectively supports that each possible SRI in the SRS resource set is associated with a set of power control parameters. The one set of power control parameters includes at least one of: an open-loop power control parameter, a closed-loop power control parameter, or a path loss measurement parameter. For example, a 1-th group of SRI-PUSCH-PowerControls correspond to a PUSCH transmission scheduled by CORESET 0; a 2-nd group of SRI-PUSCH-PowerControls correspond to a PUSCH transmission scheduled by CORESET 1.

For different SRS resource sets, when the RRC signaling configures the association relationship between the SRI and the power control parameter, the configuration of a power control parameter pool is used for distinguishing TRP. That is, power control parameter pools are respectively configured for different SRS resource sets. For example, for the SRS resource set 0, the power control parameter pool includes 2 open-loop power control parameters, 2 path loss measurement parameters and 2 closed-loop power control parameters, and when the RRC signaling configures the association relationship between the SRI and the power control parameter, the power control parameter may only be selected in a power control parameter pool of a SRS resource set 0 corresponding to the TRP 0. Similarly, for a SRS resource set 1, when the RRC signaling configures the association relationship between the SRI and the power control parameter, the power control parameter may only be selected from a power control parameter pool of a SRS resource set 1 corresponding to the TRP 1. For different SRS resource sets, when the RRC signaling configures the association relationship between the SRI and the power control parameter, the configuration of the power control parameter pool may also not distinguish the TRP. That is, different SRS resource sets share the power control parameter pool.

In an embodiment, the base station configuring the association relationship between the corresponding group of SRIs and the power control parameter for the each SRS resource set is implemented through at least one of following methods:

high-layer signaling PUSCH-Configs are configured for different TRPs or SRS resource sets, respectively;

high-layer signaling PUSCH-PowerControls are configured for different TRPs or SRS resource sets, respectively;

high-layer signaling sri-PUSCH-MappingToAddModLists and sri-PUSCH-MappingToReleaseLists are configured for different TRPs or SRS resource sets, respectively;

high-layer signaling SRI-PUSCH-PowerControl sets are configured for different TRPs or SRS resource sets, respectively; or power control parameter pools are configured for different TRPs or SRS resource sets, respectively.

The power control parameter pool includes an open-loop power control parameter pool and a closed-loop power control parameter pool, which respectively corresponds to different high-layer signaling, i.e., p0-AlphaSets and two-PUSCH-PC-AdjustmentStates. The power control parameter pool further includes a path loss measurement parameter, and corresponding high-level signaling of the path loss measurement parameter is pathlossReferenceRSToAddModList and pathlossReferenceRSToReleaseList. The p0-AlphaSets includes a set of at least one P0 and an alpha parameter, and a set of each P0 and the alpha parameter includes P0 and/or alpha.

Next, it will be described for a case that the uplink transmission is the PUCCH transmission.

In an embodiment, there is only one set of numberings for a space relationship associated with the PUCCH transmission, and each space relationship is configured with a set of power control parameters. When a number of the indicated closed-loop power controls is N, the space relationship is divided into N parts according to the closed-loop power control parameters in the power control parameter. N is an integer greater than 1. The overhead may be reduced when the MAC CE indicates the PUCCH space relationship.

For example, an association relationship between the predefined or preconfigured power control parameter and the TRP/CORESET group/PUCCH resource group at least includes an association relationship between the closed-loop power control parameter and the TRP. A MAC CE indicating the space relationship of a PUCCH may be indirectly associated with the TRP if a piece of DCI associated with a PDSCH carrying the MAC CE is associated with the TRP, and further, the MAC CE only needs to indicate the space relationship of the PUCCH resource associated with the TRP. Compared with indicating space relationships associated with all TRPs, the above method only needs to indicate part of the space relationships, so that the overhead may be reduced. For example, when N=2 above, assuming that there are 8 space relationships, where front 4 space relationships are configured with the numbering 0 of closed-loop power control and the last 4 space relationships are configured with the numbering 1 of closed-loop power control. The numbering 0 of closed-loop power control and the number 1 of closed-loop power control are associated with TRP 0 and TRP 1, respectively. If a MAC CE carried by a PDSCH transmission triggered by the DCI sent on the CORESET 0 associated with the TRP 0 indicates the PUCCH resource and the space relationship, the MAC CE only needs to indicate the front 4 space relationships. That is, Si in the MAC CE is only S0~S3 active. The remaining Si may be set to reserved values. When one MAC CE contains the space relationship of multiple PUCCH resources, the overhead of a MAC CE indicating the space relationship of the PUCCH resources may be reduced.

In another embodiment, when the base station adopts a multi-TRP transmission scenario, higher flexibility is required in the power control of the UE, one of several manners may be employed as follows.

A manner 1, a power control mechanism in the related art is used, and an upper limit number of the power control parameter is expanded. For example, an upper limit of configured numbers of at least one of the open-loop power control parameter, the closed-loop power control parameter, or the path loss measurement parameter is increased by a multiple of a number of supported TRPs. For example, when a number of supported TRPs is 2, the upper limit of the closed-loop power control number is increased by 2 times from 2, i.e., to 4. In this way, the numberings 0, 1, 2 and 3 of the closed-loop power control may be configured to different TRPs, and independent power control of the different TRPs is achieved. For example, closed-loop power control of TRP 0 is numbered 0 and 1, and thus the closed-loop power control of PUCCHs configured independently by two beam pair links on one TRP is achieved.

A manner 2: a closed-loop of different TRPs tends to be updated independently. In a case where the upper limit number of closed-loop power control parameters is not expanded, different TRPs are limited, and even if IDs of closed-loops are the same, TPC commands are independently used.

For example, the closed-loop power control is maintained independently for different TRPs. That is, the TPC command carried in the DCI may only be used for updating the TPC command corresponding to the TRP associated with the DCI. For example, when the number of supported TRPs is 2, the upper limit of the closed-loop power control number is 2. The TPC command carried by the DCI sent in the CORESET 0 corresponding to the TRP 0 may only update the closed-loop power control corresponding to the TRP 0. The TPC command carried by the DCI sent in the CORESET 1 corresponding to the TRP 1 may only update the closed-loop power control corresponding to the TRP 1. As another example, a TPC command in a piece of DCI sent by a CORESET group 0 applies to a PUCCH resource of a corresponding pucch-PowerControl/PUCCH-SpatialRelationInfo group 0; a TPC command in a piece of DCI sent by a CORESET Group 1 applies to a PUCCH resource of a corresponding pucch-PowerControl/PUCCH-SpatialRelationInfo Group 1. This has the benefit that each TRP may support an independent maximum of 2 closed-loop power controls.

A manner 3: multiple sets of space relationships are configured for a PUCCH transmission, each set of space relationships is associated with at least one of: a TRP, a CORESET or a CORESET group, a PUCCH resource (group). Or, a set of space relationships are configured for the PUCCH transmission, the set of space relationships include at least one space relationship, the set of space relationships are divided into N groups, each group of space relationships is associated with at least one of: a TRP, a CORESET or a CORESET group, or a PUCCH resource (group), and MAC CEs indicating a space relationship of the PUCCH resource indicate all space relationships of the PUCCH resource. Or, the MAC CE indicating the space relationship of the PUCCH resource only indicates the space relationship corresponding to a TRP associated with the MAC CE. The TRP associated with the MAC CE may be obtained in one of following manners: a TRP associated with a piece of DCI of a MAC CE that indicates the space relationship of the PUCCH resource may be obtained by a CORRESET of a piece of DCI of a PDSCH of MAC CE that indicates the space relationship of PUCCH resource; or a TRP of a MAC CE that sends and indicates the space relationship of the PUCCH resource is obtained by an association between a resource of a PDSCH of MAC CE that indicates the space relationship of PUCCH resource and the TRP.

A PUCCH resource indicator, a TRP with which the DCI triggering the PUCCH transmission is associated, may be obtained by the DCI triggering the PUCCH transmission. In the embodiments of the present disclosure, the UE may acquire an MAC CE (Media Access Control Element) which is sent on a TRP (Transmission Control Protocol) and is used for indicating the space relationship of the PUCCH resource according to the TRP associated with the DCI (Downlink Control Information) for triggering the PUCCH transmission, so as to obtain a PUCCH resource corresponding to the PUCCH transmission and a corresponding space relationship of the PUCCH resource, and the space relationship corresponds to the TRP. The association of the space relationship and the power control parameter includes that the base station configures an association relationship between a corresponding group of association relationships and the power control parameter for each set of space relationships. For example, a group of space relationships PUCCH-SpatialRelationInfo is configured for TRP, RRC signaling, each of PUCCH-SpatialRelationInfo indicates the associated power control parameter. The associated power control parameter indicated in the PUCCH-SpatialRelationInfo is a corresponding power control parameter numbering configured in the power control parameter pool, and at least includes one of: an open-loop power control parameter numbering, a closed-loop power control parameter numbering, or a path loss measurement reference signal.

The configuration of the power control parameter pool is TRP-differentiated. For example, for TRP 0, the power control parameter pool includes two open-loop power control parameters, two path loss measurement parameters and two closed-loop power control parameters, when the RRC signaling configures an association relationship between the space relationship and the power control parameter, the power control parameter may only be selected in the power control parameter pool corresponding to the TRP 0. Similarly, for the TRP 1, when the RRC signaling configures the association relationship between the space relationship and the power control parameter, the power control parameter may only be selected in the power control parameter pool corresponding to the TRP 1. The configuration of the power control parameter pool may also be TRP indiscriminate. Namely, the space relationships corresponding to different TRPs share the power control parameter pool.

In an embodiment, the base station configuring the association relationship between the corresponding group of SRIs and the power control parameter for the each SRS resource set is implemented through at least one of following methods:

high-layer signaling PUSCH-Configs are configured for different TRPs, respectively;

high-layer signaling PUSCH-PowerControls are configured for different TRPs, respectively, for example, 2 TRPs correspond to 1 PUCCH-PowerControl, respectively;

high-layer signaling PUCCH-SpatialRelationInfo sets are configured for different TRPs, respectively; or power control parameter pools are configured for different TRPs, respectively.

The power control parameter pool includes an open-loop power control parameter pool and a closed-loop power control parameter pool, which respectively corresponds to different high-layer signaling, i.e., p0-Set and twoPUCCH-PC-AdjustmentStates. The power control parameter pool further includes a path loss measurement parameter, and corresponding high-level signaling of the path loss measurement parameter is pathlossReferenceRSs.

For example, all PUCCH-SpatialRelationInfos are divided into 2 groups, each group corresponds to 1 TRP/CORESET group/PUCCH resource (group), and each group also corresponds to one pucch-PowerControl.

Finally, it will be described for a case that the uplink transmission is an SRS transmission.

The base station configures at least one SRS resource set and at least one SRS resource for the UE. Each SRS resource set includes at least one SRS resource. Each SRS resource set may be configured for one of following purposes: a beam management, an antenna switching, a codebook based transmission (CB), a non-codebook based transmission (NCB). Each SRS resource set is further configured with the power control parameter. For the open-loop power control parameter and the path loss measurement parameter, contents of related parameters are directly configured; and for the closed-loop power control parameter, a closed-loop power control which is the same as a closed-loop power control transmitted by the PUSCH or independent from the SRS may be configured. When the SRS is the same as the closed-loop power control of the PUSCH transmission, it may be the same as the closed-loop power control numbering 0 or the closed-loop power control numbering 1 of the PUSCH transmission. Moreover, the SRS transmission only uses a value of a local closed-loop power control corresponding to a corresponding closed-loop power control numbering of the PUSCH transmission, and is not responsible for updating a value of the local closed-loop power control.

For a SRS resource sets for the codebook based transmission or the non-codebook based transmission, N SRS resource sets need to be supported, each SRS resource set is associated with at least one of: a TRP, a CORESET, or a CORESET group. For example, when 2 TRPs are supported, 2 SRS resource sets for the codebook based transmission are configured for one TRP on one bandwidth part (BWP), and the 2 SRS resource sets for the non-codebook based transmission are also configured for one TRP on one bandwidth part (BWP). The N SRS resource sets are sent in a TDM manner. SRS resource sets corresponding to different TRPs, CORESETs or CORESET groups respectively correspond to closed-loop power control parameters of different PUSCH transmissions. For example, SRS resource sets corresponding to different TRPs, CORESETs, or CORESET groups correspond to closed-loop power control parameters of PUSCH transmissions corresponding to different TRPs, CORESETs, or CORESET groups, respectively.

When the SRS resource set is the same as the closed-loop power control parameter of the PUSCH, a local closed-loop power control value corresponding to a closed-loop power control parameter transmitted by a PUSCH corresponding to the TRP, the CORESET or the CORESET group is only updated by a TPC command in the DCI of the TRP, the CORESET or the CORESET group. When the SRS resource set is different from the closed-loop power control parameter of the PUSCH, a local closed-loop power control value corresponding to a closed-loop power control parameter transmitted by a SRS corresponding to the TRP, the CORESET or the CORESET group is only updated by a TPC command in the DCI of the TRP, the CORESET or the CORESET group. In addition to the CORESET and the CORESET group described above being associated with the TRP, there may also be one type of CORESET that is not associated with a particular TRP, which may also be referred to as a common CORESET, or a common TRP CORSET. The TPC command included in a piece of DCI sent on the common CORESET is valid for all TRP-associated closed-loop power control parameters. That is, the TPC command included in the DCI sent on the common CORESET updates local closed-loop power control values corresponding to the closed-loop power control parameters associated with all TRPs.

When the base station schedules the uplink transmission of the UE, many factors including a time-frequency resource, a transmission rate, a modulation and coding manner, a multiple-input multiple-output (MIMO) manner and the like need to be determined, and the base station needs to judge which factors need to be adjusted in a subsequent scheduling, such as improvement of the modulation and coding manner, improvement of the sending power according to the received quality. However, the base station does not know a current sending power of the UE, nor does it know whether the sending power may be increased. Therefore, there is a mechanism in which the UE sends a power headroom report (PHR) to the base station, and explicitly informs a difference between a sending power required for a current transmission and a maximum sending power.

When the power control method provided in the embodiments of the present application is adopted, at least one piece of spatial domain resource information is associated with the power control parameter, so that the PHR may be associated with the TRP information and/or CORESET information in order to enable the base station to accurately acquire the PHR.

The PHR includes a PHR associated with TRP information and/or CORESET information related to a PUSCH transmission carrying the PHR. The UE acquires the PHR, which is associated with the TRP information or the CORESET information. In an embodiment, the PHR includes only a PHR associated with TRP information and/or CORESET information related to a PUSCH transmission carrying the PHR; and does not include other TRP information or PHR information associated with the CORESET information.

In an embodiment, the TRP information or the CORESET information related to the PUSCH transmission carrying the PHR is determined according to one of following information: a scheduling of a CORESET to which DCI of the PUSCH transmission carrying the PHR belongs; an activating a CORESET to which DCI of the PUSCH transmission carrying the PHR belongs; or TRP information or CORESET information configured for the PUSCH transmission carrying the PHR.

The scheduling of the CORESET to which the DCI of the PUSCH transmission carrying the PHR belongs mainly aims at a case that the PUSCH transmission carrying the PHR is a grant based PUSCH transmission. The activating the CORESET to which the DCI of the PUSCH transmission carrying the PHR belongs mainly aims at a case that the PUSCH transmission carrying the PHR is a type 2 of PUSCH transmission of a configuration grant. The TRP information or the CORESET information configured for the PUSCH transmission carrying the PHR mainly aims at a case that the PUSCH transmission carrying the PHR is a type 1 of PUSCH transmission of a configuration grant.

The CORESET information may include one of a CORESET, a CORESET group, a CORESET index, or a CORESET group index; and the TRP information includes one of a TRP, a TRP group, a TRP index and a TRP group index. The PHR includes TRP information or CORESET information associated with the DCI for scheduling the PUSCH transmission carrying the PHR.

The UE monitors a channel by measuring a downlink pilot signal, and triggers a PHR when the path loss change exceeds a certain threshold. When the UE has a proper uplink transmission opportunity, the UE transmits the PHR to the base station in the form of MAC CE. In a multi-carrier system, PHR information sent by the UE to the base station includes PHRs of all activated component cells (CCs). The path loss variation exceeding a certain threshold is referred to as a variation relative to a path loss amount corresponding to a PHR reported last time.

In addition to a fact that the path loss change described above exceeds the threshold, the periodic effect is achieved. When the PHR reporting event does not occur beyond a certain time, the PHR is also triggered. The PHR includes a real PHR and a virtual PHR. The virtual PHR is also referred to as a reference PHR. The real PHR is a PHR calculated based on a real uplink transmission. The real PHR is obtained by subtracting the maximum sending power from the sending power required by the real uplink transmission. The sending power required by the real uplink transmission is related to at least one of following parameters: a frequency domain width occupied by a transmission, a frequency domain position occupied by a transmission, a data rate of a transmission, a modulation and coding scheme (MCS) of a transmission, a format of a transmission, an open-loop power control part, a closed-loop power control part, or a path loss compensation part. The virtual PHR is a PHR calculated based on the reference uplink transmission. The virtual PHR is obtained by subtracting an open-loop power control part, a closed-loop power control part, or a path loss compensation part of a reference transmission from the maximum sending power. The reference transmission is a hypothetical transmission, not a true transmission, and thus the power control parameter of the reference transmission is a predefined parameter. The PHR may be distinguished into different types depending on the type of transmission considered for calculating the PHR, and the combination of transmissions. For example, a type 1 of PHR is for a PUSCH transmission, a type 2 of PHR is for a PUCCH transmission or a PUCCH+PUSCH transmission, and a type 3 of PHR is for an SRS transmission.

In an embodiment, in a multi-TRP transmission scenario, PHR should also be grouped into different groups according to the TRP since different TRPs are independent of the links of the UE. The PHR is associated with at least one of: a TRP, a CORESET group, or a CORESET group. The mechanism for independently maintaining the PHR by the UE for different TRPs includes at least one of downlink RSs from different TRPs are respectively measured to calculate a path loss related to the TRP, and a PHR related to the TRP is triggered when the path loss change of one TRP exceeds a certain threshold; the reporting period of the PHR is independently maintained for different TRPs; the PHR information sent to the specific TRP only includes the PHR associated with the TRP; for example, the base station supports 2 TRPs, and PHR information sent to a first TRP only includes a PHR associated with the first TRP, and PHR information sent to a second TRP only includes a PHR associated with the second TRP. PHR information included in a PUSCH scheduled in a piece of DCI sent on a particular TRP, CORESET, or CORESET group includes only the PHR associated with that TRP, CORESET, or CORESET group.

In an embodiment, in a multi-TRP transmission scenario, since different TRPs are independent of the links of the UE, the PUSCH with a configuration grant should configure a power control parameter corresponding to the associated TRP. The base station configures granted PUSCHs associated with different TRPs, and implements different power control parameters by at least one of following methods: high-layer signaling ConfiguredGrantConfig is configured for different TRPs; an open-loop power control parameter, a closed-loop power control parameter, and a path loss measurement parameter of high-layer signaling are respectively configured for different TRPs, such as p0-PUSCH-Alpha, powerControlLoopToUse, and pathlossReferenceIndex. These open-loop power control parameter, closed-loop power control parameter, and path loss measurement parameter indicate a numbering of corresponding parameter in a power control parameter pool of the PUSCH. Therefore, it may be divided into two cases: a power control parameter pool of independent PUSCH is configured for different TRPs, and an open-loop power control parameter, a closed-loop power control parameter and a path loss measurement parameter of TRP-related high-layer signaling of granted PUSCH are indicated from a power control parameter pool of a PUSCH associated with each TRP. If there is only one set of power control parameter pools of the PUSCH, an open-loop power control parameter, a closed-loop power control parameter and a path loss measurement parameter of the TRP-related high-layer signaling of the granted PUSCH are indicated from this set of power control parameter pools of the PUSCH. At least one of following is related to the TRP, i.e. different TRPs need to be independently configured: the open-loop power control parameter, the closed-loop power control parameter, and the path loss measurement parameter.

For example, the base station configures the parameters of the granted PUSCH for the UEs with the parameters ConfiguredGrantConfig. In a scenario in which multiple TRPs are supported, the base station may configure at least one ConfiguredGrantConfig for the UE, and each ConfiguredGrantConfig may include TRP information or CORESET information (identified by GroupId). As follows:

| | |
|---|---|
| ConfiguredGrantConfig ::= | SEQUENCE { |
| ConfiguredGrantConfig-Id | ConfiguredGrantConfig-Id |
| ... | |
| GroupId | GroupId |
| ... | |
| } | |

The ConfiguredGrantConfig includes the TRP information or the CORESET information, which may be directly included in the ConfiguredGrantConfig and used for configuring a type 1 and type 2 of the granted PUSCH. It may also be configured in the parameter rrc-ConfiguredUplinkGrant used exclusively for the type 1 in the ConfiguredGrantConfig, i.e., type 1 used for only configuring the granted PUSCHs.

| | |
|---|---|
| ConfiguredGrantConfig ::= | SEQUENCE { |
| ... | |
| ConfiguredGrantConfig-Id | ConfiguredGrantConfig-Id |
| ... | |
| rrc-ConfiguredUplinkGrant | SEQUENCE { |
| ... | |
| GroupID     GroupID | |
| ... | |
| } | |
| } | |

Multiple configuredGrantConfig parameters may be included in the upper layer parameters of the configuredGrantConfig, which are respectively used for TRP information or CORESET information corresponding to different GroupId. Here, 2 GroupIds are used as an example, and multiple GroupId may be easily expanded and will not be described again.

| | |
|---|---|
| BWP-UplinkDedicated ::= | SEQUENCE { |
| ... | |
| configuredGrantConfigforGroup0 | SetupRelease |
| { ConfiguredGrantConfig } | |
| configuredGrantConfigforGroup1 | SetupRelease |
| { ConfiguredGrantConfig } | |
| ... | |
| } | |
| Or, as follows: | |
| BWP-UplinkDedicated ::= | SEQUENCE { |
| ... | |
| configuredGrantConfig | SEQUENCE (SIZE (1..maxNrofconfiguredGrantConfigs)) |
| OF ConfiguredGrantConfig | |
| ... | |
| } | |
| Or, | |
| BWP-UplinkDedicated ::= | SEQUENCE { |

-continued

```
    ...
    configuredGrantConfigToAddModList                SEQUENCE (SIZE
(1..maxNrofconfiguredGrantConfigs)) OF configuredGrantConfig
    configuredGrantConfigToReleaseList               SEQUENCE (SIZE
(1..maxNrofconfiguredGrantConfigs)) OF configuredGrantConfig-Id
    ...
}
```

The upper layer parameter BWP-UplinkDedicated of the configuredGrantConfig includes at least one configuredGrantConfig parameter. The configuredGrantConfig parameter may or may not include GroupId. When the GroupId is not included, a relationship of multiple configuredGrantConfig parameters and the Groupid is predefined.

The UE acquires a configuration parameter of the configuredGrantConfig, obtain a GroupId of the configuredGrantConfig, and then corresponding TRP information and/or CORESET information is obtained. When the UE sends a PUSCH transmission of the type 1, its corresponding high-layer configuration parameter may be determined, thereby the TRP information and/or the CORESET information corresponding to the PUSCH transmission is obtained.

The UE may determine its power control parameter, SRS resource set, etc., by TRP information and/or CORESET information corresponding to the PUSCH transmission. For example, corresponding IDs are parsed only in the power control parameter and the parameter pool of the SRS resource set corresponding to the TRP information and/or the CORESET information corresponding to the PUSCH transmission.

Figure 5:
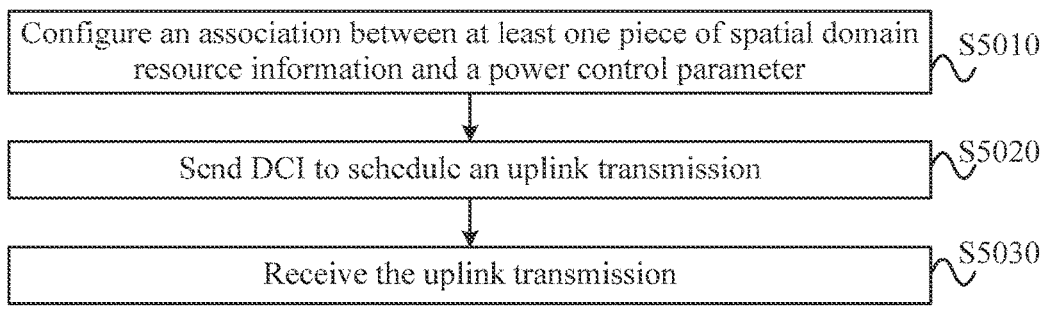
FIG. 5 is a flowchart of another power control method provided in an embodiment.

FIG. 5 is a flowchart of another power control method provided in an embodiment, as shown in FIG. 5, the method provided in this embodiment includes following.

In S5010, an association between at least one piece of spatial domain resource information and a power control parameter is configured.

In S5020, DCI is sent to schedule an uplink transmission.

In S5030, the uplink transmission is received.

The power control method provided in this embodiment is applied to a network side terminal equipment in a wireless communication system, such as a base station. The base station uses a downlink channel to perform a downlink transmission in the wireless communication system, and schedules resources used by a UE to perform an uplink transmission through scheduling information. The power control method provided in this embodiment is used for scheduling the uplink transmission of the UE, the UE includes the UE of the embodiment shown in FIG. 3. The base station firstly configures the association between the at least one piece of spatial domain resource information and the power control parameter, and the spatial domain resource information includes at least one type of CORESET information, TRP information, or PUCCH resource information; the base station may then send the DCI to schedule the uplink transmission and receive the uplink transmission sent by the UE. The resource used by the UE for sending the uplink transmission is scheduled by the base station through the DCI, the UE may determine a corresponding spatial domain resource through the DCI, and then the power control of the UE for the uplink transmission may be realized through the association between the spatial domain resource information and the power control parameter. The method for configuring the association of the at least one spatial domain resource information and the power control parameter by the base station has been described in detail in the embodiment shown in FIG. 3, which will not be repeated again in this embodiment.

In an embodiment, the configuration of the association between the at least one piece of spatial domain resource information and the power control parameter includes: the association between the at least one piece of spatial domain resource information and the power control parameter is configured by adopting one of following information: a power control parameter or a power control related parameter, where the power control related parameter includes spatial domain resource information associated with the power control parameter; spatial domain resource information or a spatial domain resource information related parameter, where the spatial domain resource information related parameter includes a power control parameter associated with the spatial domain resource information; a power control related parameter, where the power control related parameter includes at least one set of power control parameters, each set of power control parameters are associated with spatial domain resource information; an association of predefined spatial domain resource information with the power control parameter; or an association of configured spatial domain resource information with the power control parameter; where the power control related parameter includes the power control parameter, and the spatial domain resource information related parameter includes the spatial domain resource information parameter.

In an embodiment, the spatial domain resource information further includes at least one type of space relationship information or reference signal information.

In an embodiment, if spatial domain resource information in an association between one piece of spatial domain resource information and the power control parameter includes at least two types of the CORESET information, the TRP information, the PUCCH resource information, the space relationship information, or the reference signal information, then an association relationship of the at least two types is configured.

In an embodiment, configuration of the association between the at least one piece of spatial domain resource information and the power control parameter includes: an association of all types of the spatial domain resource information and the power control parameter is configured; or at least one association corresponding to other types of spatial domain resource information and the power control parameter is configured by one type of spatial domain resource information in the spatial domain resource information.

Figure 6:
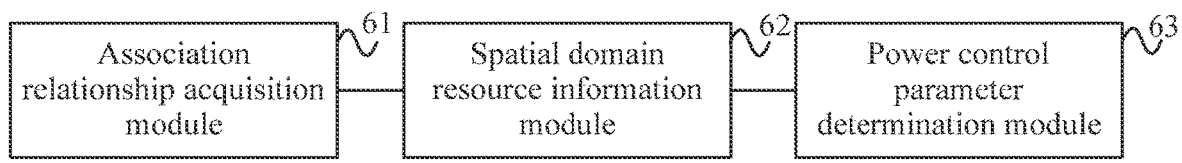
FIG. 6 is a structural diagram of a power control apparatus provided in an embodiment.

FIG. 6 is a structural diagram of a power control apparatus provided in an embodiment, as shown in FIG. 6, and the power control apparatus provided in this embodiment includes an association relationship acquisition module 61, a spatial domain resource information module 62 and a power control parameter determination module 63. The association relationship acquisition module 61 is configured to acquire an association between at least one piece of spatial domain resource information and a power control parameter. The spatial domain resource information module is configured to acquire spatial domain resource information of an uplink transmission. The power control parameter determination module is configured to determine a power control parameter of the uplink transmission according to the spatial domain resource information of the uplink transmission and the association between the at least one piece of spatial domain resource information and the power control parameter. The spatial domain resource information includes at least one type of CORESET information, TRP information, or PUCCH resource information.

The power control apparatus provided in this embodiment is used for implementing the power control method of the embodiment shown in FIG. 3, and the implementation principle and technical effect of the power control apparatus provided in this embodiment are similar to those of the power control method, which are not repeated here again.

In an embodiment, in the embodiment shown in FIG. 6, the association relationship acquisition module 61 is configured to acquire the association between the at least one piece of spatial domain resource information and the power control parameter according to one of following information: a power control parameter or a power control related parameter, where the power control related parameter includes spatial domain resource information associated with the power control parameter; spatial domain resource information or a spatial domain resource information related parameter, where the spatial domain resource information related parameter includes a power control parameter associated with the spatial domain resource information; a power control related parameter, where the power control related parameter includes at least one set of power control parameters, each set of power control parameters are associated with spatial domain resource information; an association of predefined spatial domain resource information with the power control parameter; or an association of configured spatial domain resource information with the power control parameter; where the power control related parameter includes the power control parameter, and the spatial domain resource information related parameter includes the spatial domain resource information parameter In an embodiment, in the embodiment shown in FIG. 6, the spatial domain resource information further includes at least one type of space relationship information or reference signal information.

In an embodiment, in the embodiment shown in FIG. 6, if spatial domain resource information in an association between one piece of spatial domain resource information and the power control parameter includes at least two types of the CORESET information, the TRP information, the PUCCH resource information, the space relationship information, or the reference signal information, then an association relationship of the at least two types is configured.

In an embodiment, in the embodiment shown in FIG. 6, the association between the spatial domain resource information and the power control parameter includes: an association of all types of the spatial domain resource information and the power control parameter; or at least one association corresponding to other types of spatial domain resource information and the power control parameter and configured by one type of spatial domain resource information in the spatial domain resource information.

In an embodiment, in the embodiment shown in FIG. 6, the CORESET information includes one of a CORESET, a CORESET group, a CORESET index, or a CORESET group index; the TRP information includes one of a TRP, a TRP group, a TRP index and a TRP group index; the PUCCH resource information includes one of a PUCCH resource, a PUCCH resource group, a PUCCH resource index or a PUCCH resource group index; the space relationship information includes at least one piece of reference signal information; and the reference signal information includes one of a reference signal, a reference signal resource, a reference signal resource set, a reference signal resource grouping, a reference signal index, a reference signal resource index, a reference signal resource set index, or a reference signal resource grouping index.

In an embodiment, in the embodiment shown in FIG. 6, the spatial domain resource information module 62 is configured to acquire the CORESET information and/or the TRP information in the spatial domain resource information according to a CORESET to which DCI related to the uplink transmission belongs.

In an embodiment, in the embodiment shown in FIG. 6, the DCI related to the uplink transmission includes one of: a scheduling of the DCI of the uplink transmission, an activating of the DCI of the uplink transmission, or the DCI responded by the uplink transmission.

In an embodiment, in the embodiment shown in FIG. 6, the power control parameter includes at least one of an open-loop power control parameter, a closed-loop power control parameter, or a path loss measurement parameter.

In an embodiment, in the embodiment shown in FIG. 6, the open-loop power control parameter includes at least one of an open-loop power control parameter identifier, a target receiving power or a path loss factor; the path loss measurement parameter includes at least one of a path loss measurement parameter identifier, a reference signal resource type indication for a path loss measurement, or a reference signal resource indication for a path loss measurement; and the closed-loop power control parameter includes at least one of a closed-loop power control process identifier, or a number of closed loop power control processes.

In an embodiment, in the embodiment shown in FIG. 6, the uplink transmission includes one of: a PUSCH transmission, a PUCCH transmission, or a SRS transmission.

In an embodiment, in the embodiment shown in FIG. 6, the power control apparatus further includes a power adjustment module. The power adjustment module is configured to acquire a TPC command in DCI, and the TPC command is used for updating a power control adjustment state of a closed-loop power control parameter associated with the DCI.

In an embodiment, in the embodiment shown in FIG. 6, the closed-loop power control parameter associated with the DCI is determined by adopting following manners: the CORESET information and/or the TRP information is determined according to a CORESET to which the DCI belongs; and a closed-loop power control parameter in a power control parameter associated with the determined CORESET information and/or the determined TRP information is determined according to the determined CORESET information and/or the determined TRP information.

In an embodiment, in the embodiment shown in FIG. 6, the TPC command corresponds to a same closed-loop power control parameter of a same group of uplink transmissions as the power control adjustment state of the closed-loop power control parameter; the same group of uplink transmissions have an association relationship with at least one of the CORESET information or the TRP information determined by the CORESET to which the DCI belongs.

In an embodiment, in the embodiment shown in FIG. 6, the power control apparatus further includes a power headroom acquisition module configured to acquire a PHR, where the PHR is associated with the TRP information or the CORESET information.

In an embodiment, in the embodiment shown in FIG. 6, the CORESET information includes one of a CORESET, a CORESET group, a CORESET index, or a CORESET group index; and the TRP information includes one of a TRP, a TRP group, a TRP index and a TRP group index.

In an embodiment, in the embodiment shown in FIG. 6, the PHR includes TRP information or CORESET information associated with a piece of DCI for scheduling a PUSCH transmission carrying the PHR.

The power control method provided in this embodiment may be applied to a base station or a UE in a wireless communication network, and the difference is that the base station completes the configuration of various information and association relations, and the UE receives the information sent by the base station and measures a network parameter.

Figure 7:
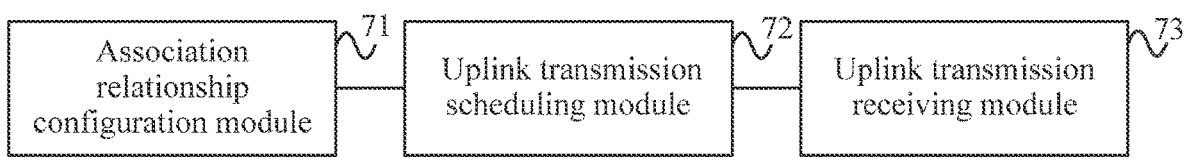
FIG. 7 is a structural diagram of another power control apparatus provided in an embodiment.

FIG. 7 is a structural diagram of another power control apparatus provided in an embodiment, as shown in FIG. 7, and the power control apparatus provided in this embodiment includes an association relationship configuration module 71, an uplink transmission scheduling module 72 and an uplink transmission receiving module 73. The association relationship configuration module 71 is configured to configure an association between at least one piece of spatial domain resource information and a power control parameter. The uplink transmission scheduling module 72 is configured to send DCI to schedule an uplink transmission. The uplink transmission receiving module 73 is configured to receive the uplink transmission. The spatial domain resource information includes at least one type of CORESET information, TRP information, or PUCCH resource information.

The power control apparatus provided in this embodiment is used for implementing the power control method of the embodiment shown in FIG. 5, and the implementation principle and technical effect of the power control apparatus provided in this embodiment are similar to those of the power control method, which are not repeated here again.

In an embodiment, in the embodiment shown in FIG. 7, the association between the at least one piece of spatial domain resource information and the power control parameter includes one of following information: a power control parameter or a power control related parameter, where the power control related parameter includes spatial domain resource information associated with the power control parameter; spatial domain resource information or a spatial domain resource information related parameter, where the spatial domain resource information related parameter includes a power control parameter associated with the spatial domain resource information; a power control related parameter, where the power control related parameter includes at least one set of power control parameters, each set of power control parameters are associated with spatial domain resource information; an association of predefined spatial domain resource information with the power control parameter; or an association of configured spatial domain resource information with the power control parameter; where the power control related parameter includes the power control parameter, and the spatial domain resource information related parameter includes the spatial domain resource information parameter In an embodiment, in the embodiment shown in FIG. 7, the spatial domain resource information further includes at least one type of space relationship information or reference signal information.

In an embodiment, in the embodiment shown in FIG. 7, the association relationship configuration module is further configured to configure an association relationship of at least two types if spatial domain resource information in an association between one piece of spatial domain resource information and the power control parameter includes the at least two types of the CORESET information, the TRP information, the PUCCH resource information, the space relationship information, or the reference signal information.

In an embodiment, in the embodiment shown in FIG. 7, the association relationship configuration module 71 is configured to configure an association of all types of the spatial domain resource information and the power control parameter is configured; or configure at least one association corresponding to other types of spatial domain resource information and the power control parameter for one type of spatial domain resource information in the spatial domain resource information.

Figure 8:
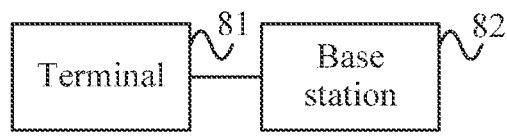
FIG. 8 is a structural diagram of a power control system provided in an embodiment.

FIG. 8 is a structural diagram of a power control system provided in an embodiment, as shown in FIG. 8, the power control system provided in this embodiment includes a terminal 81 and a base station 82. The terminal includes the power control apparatus as shown in FIG. 6, and the base station includes the power control apparatus as shown in FIG. 7.

Figure 9:
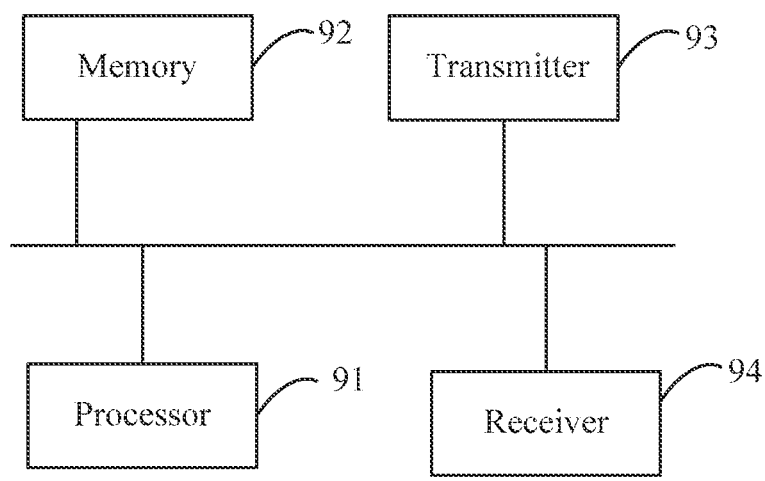
FIG. 9 is a structural diagram of a terminal provided in an embodiment.

FIG. 9 is a structural diagram of a terminal provided in an embodiment, as shown in FIG. 9, the terminal includes a processor 91, a memory 92, a transmitter 93 and a receiver 94. A number of processors 91 in the terminal may be one or more, and one processor 91 is used as an example in FIG. 9. The processor 91 and the memory 92 in the terminal may be connected via a bus or in other manners, an example in which the processor 91 and the memory 92 in the terminal are connected via the bus is used in FIG. 9.

The memory 92 serves as a computer-readable storage medium and may be configured to store software programs, computer executable programs and modules, such as program instructions/modules corresponding to the power control method in the embodiments of FIG. 3 and FIG. 4 in the present application (e.g., the association relationship acquisition module 61, the spatial domain resource information module 62 and the power control parameter determination module 63 in the power control apparatus). The processor 91 achieves at least one functional application and data processing by executing the software programs, the instructions and the modules stored in the memory 92, so that the power control method described above is implemented.

The memory 92 may mainly include a storage program region and a storage data region, where the storage program region may store an operating system, an application program required for at least one function; the storage data area may store data and the like which may be created according to the use of the terminal. Moreover, the memory 92 may include a high-speed random access memory and may further include a non-volatile memory, such as at least one magnetic disk storage device, a flash memory device, or other non-volatile solid-state memory device.

The transmitter 93 is a combination of modules or devices capable of transmitting radio frequency signals into space, including, for example, a combination of radio frequency transmitters, antennas, and other devices. The receiver 94 is a combination of modules or devices capable of receiving radio frequency signals from space, including, for example, a combination of radio frequency receivers, antennas, and other devices.

Figure 10:
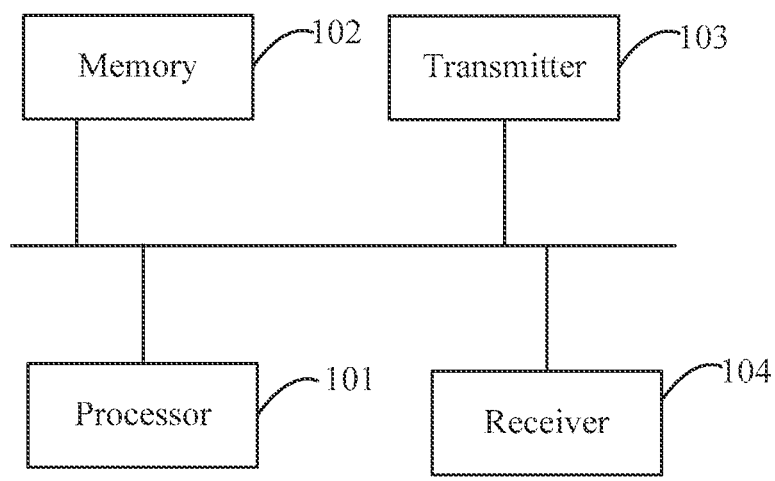
FIG. 10 is a structural diagram of a base station provided in an embodiment.

FIG. 10 is a structural diagram of a base station provided in an embodiment, as shown in FIG. 10, the base station includes a processor 101, a memory 102, a transmitter 103 and a receiver 104. A number of processors 101 in the terminal may be one or more, and one processor 101 is used as an example in FIG. 9; the processor 101 and the memory 102 in the terminal may be connected via a bus or in other manners, an example in which the processor 101 and the memory 102 in the terminal are connected via the bus is used in FIG. 9.

The memory 102 serves as a computer-readable storage medium and may be configured to store software programs, computer executable programs and modules, such as program instructions/modules corresponding to the power control method in the embodiments of FIG. 3 and FIG. 4 in the present application (e.g., the association relationship configuration module 71, the uplink transmission scheduling module 72 and the uplink transmission receiving module 73 in the power control apparatus). The processor 101 achieves at least one functional application and data processing by executing the software programs, the instructions and the modules stored in the memory 102, so that the power control method described above is implemented.

The memory 102 may mainly include a storage program region and a storage data region, where the storage program region may store an operating system, an application program required for at least one function; the storage data area may store data and the like which may be created according to the use of the terminal. Moreover, the memory 102 may include a high-speed random access memory and may further include a non-volatile memory, such as at least one magnetic disk storage device, a flash memory device, or other non-volatile solid-state memory device.

The transmitter 103 is a combination of modules or devices capable of transmitting radio frequency signals into space, including, for example, a combination of radio frequency transmitters, antennas, and other devices. The receiver 94 is a combination of modules or devices capable of receiving radio frequency signals from space, including, for example, a combination of radio frequency receivers, antennas, and other devices.

An embodiment of the present application further provides a storage medium containing a computer executable instruction, and the computer executable instruction is used for performing the power control method when being executed by a computer processor. The method includes: an association between at least one piece of spatial domain resource information and a power control parameter is acquired; spatial domain resource information of an uplink transmission is acquired; and a power control parameter of the uplink transmission is determined according to the spatial domain resource information of the uplink transmission and the association between the at least one piece of spatial domain resource information and the power control parameter; where the spatial domain resource information includes at least one type of CORESET information, TRP information, or PUCCH resource information.

An embodiment of the present application further provides a storage medium containing a computer executable instruction, and the computer executable instruction is used for performing the power control method when being executed by a computer processor. The method includes: an association between at least one piece of spatial domain resource information and a power control parameter is configured; DCI is sent to schedule an uplink transmission; and the uplink transmission is received; where the spatial domain resource information includes at least one type of CORESET information, TRP information, or PUCCH resource information.

In the embodiments of the present disclosure, the base station and the UE are used for description for convenience, but are not limited to the embodiments of the present disclosure. In an implementation process, the base station and the UE may be replaced by the names of various communication nodes such as a NodeB (NB), a gNB, a TRP, an Access Point (AP), a station, a user, a station (STA), a relay, or a terminal. The base station may also refer to a network, a universal terrestrial radio access (UTRA), an evolved universal terrestrial radio access (EUTRA), and the like.

The above description is only an exemplary embodiment of the present application, and is not intended to limit the scope of protection of the present application.

It should be appreciated by those skilled in the art that the term "user terminal" covers any suitable type of wireless user equipment, such as a mobile phone, a portable data processing device, a portable web browser or an in-vehicle mobile station.

In general, various embodiments of the present application may be implemented in hardware or special purpose circuits, software, logic or any combination thereof. For example, some aspects may be implemented in hardware, while other aspects may be implemented in firmware or software which may be executed by a controller, microprocessor or other computing device, although the present application is not limited thereto.

Embodiments of the present application may be implemented by a data processor of a mobile device executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), etc. A computer-readable medium may include a non-instantaneous storage medium. The data processor may be of any type suitable for the local technical environment, such as, but not limited to, a general-purpose computer, a specialized computer, a microprocessor, a digital signal processor (DSP), an application specific integrated circuit (ASIC), a field-programmable gate array (FPGA)), and a processor based on a multi-core processor architecture.

What is claimed is:

1. A power control method, comprising:
   acquiring an association between at least one piece of spatial domain resource information and a power control parameter;
   acquiring spatial domain resource information of an uplink transmission; and determining, according to the spatial domain resource information of the uplink transmission and the association between the at least one piece of spatial domain resource information and the power control parameter, a power control parameter of the uplink transmission;
wherein the spatial domain resource information comprises at least one type of control resource set (CORESET) information, or transmit-receive point (TRP) information;
wherein the power control method further comprises: acquiring a power headroom report (PHR), and wherein the PHR is associated with at least one of the TRP information or the CORESET information; and
wherein the PHR comprises a PHR associated with at least one of TRP information or CORESET information related to a PUSCH transmission carrying the PHR.

2. The method of claim 1, wherein the acquiring the association between the at least one piece of spatial domain resource information and the power control parameter comprises:
acquiring the association between the at least one piece of spatial domain resource information and the power control parameter according to one of following information:
power control parameter, wherein the power control parameter comprises spatial domain resource information associated with the power control parameter;
spatial domain resource information or a spatial domain resource information related parameter, wherein the spatial domain resource information or the spatial domain resource information related parameter comprises a power control parameter associated with the spatial domain resource information, and the spatial domain resource information related parameter comprises a spatial domain resource information parameter;
a power control related parameter, wherein the power control related parameter comprises at least one set of power control parameters, each set of power control parameters are associated with spatial domain resource information, and the power control related parameter comprises the power control parameter;
an association of predefined spatial domain resource information with the power control parameter; or
an association of configured spatial domain resource information with the power control parameter.

3. The method of claim 1, wherein the spatial domain resource information further comprises at least one type of space relationship information or reference signal information.

4. The method of claim 3, wherein in a case where spatial domain resource information in the association between the at least one piece of spatial domain resource information and the power control parameter comprises at least two types of the CORESET information, the TRP information, the space relationship information, or the reference signal information, the at least two types of the CORESET information, the TRP information, the space relationship information, or the reference signal information have an association relationship.

5. The method of claim 3, wherein the CORESET information comprises one of a CORESET, a CORESET group, a CORESET index, or a CORESET group index;
the TRP information comprises one of a TRP, a TRP group, a TRP index and a TRP group index;
the space relationship information comprises at least one piece of reference signal information; and the reference signal information comprises one of a reference signal, a reference signal resource, a reference signal resource set, a reference signal resource grouping, a reference signal index, a reference signal resource index, a reference signal resource set index, or a reference signal resource grouping index.

6. The method of claim 1, wherein the acquiring the spatial domain resource information of the uplink transmission comprises:
acquiring, according to a CORESET to which downlink control information (DCI) related to the uplink transmission belongs, at least one of the CORESET information or the TRP information in the spatial domain resource information; or
acquiring at least one of CORESET information or TRP information configured for the uplink transmission;
wherein the DCI related to the uplink transmission comprises one of: a scheduling of the DCI of the uplink transmission, an activating of the DCI of the uplink transmission, or the DCI responded by the uplink transmission.

7. The method of claim 1, wherein the power control parameter comprises at least one of an open-loop power control parameter, a closed-loop power control parameter, or a path loss measurement parameter;
the open-loop power control parameter comprises at least one of an open-loop power control parameter identifier, a target receiving power or a path loss factor;
the path loss measurement parameter comprises at least one of a path loss measurement parameter identifier, a reference signal resource type indication for a path loss measurement, or a reference signal resource indication for a path loss measurement; and
the closed-loop power control parameter comprises at least one of a closed-loop power control process identifier, or a number of closed loop power control processes.

8. The method of claim 1, further comprising:
acquiring a transmission power control (TPC) command in DCI; and
updating, by the TPC command, a power control adjustment state of a closed-loop power control parameter associated with the DCI.

9. The method of claim 8, wherein the closed-loop power control parameter associated with the DCI is determined by adopting following manners:
determining, according to a CORESET to which the DCI belongs, at least one of the CORESET information or the TRP information; and
determining, according to at least one of the determined CORESET information or the determined TRP information, a closed-loop power control parameter in a power control parameter associated with the at least one of the determined CORESET information or the determined TRP information.

10. The method of claim 8, wherein the TPC command corresponds to a same closed-loop power control parameter of a same group of uplink transmissions as the power control adjustment state of the closed-loop power control parameter; the same group of uplink transmissions have an association relationship with at least one of the CORESET information or the TRP information determined by the CORESET to which the DCI belongs.

11. The method of claim 1, wherein the TRP information or the CORESET information related to the PUSCH transmission carrying the PHR is determined according to one of following information:

a scheduling of a CORESET to which DCI of the PUSCH transmission carrying the PHR belongs;
an activating a CORESET to which DCI of the PUSCH transmission carrying the PHR belongs; or
TRP information or CORESET information configured for the PUSCH transmission carrying the PHR.

12. The method of claim 1, wherein the PHR comprises TRP information or CORESET information associated with DCI related to the PUSCH transmission carrying the PHR.

13. A power control method, comprising:
configuring an association between at least one piece of spatial domain resource information and a power control parameter;
sending downlink control information (DCI) to schedule an uplink transmission; and receiving the uplink transmission;
wherein the spatial domain resource information comprises at least one type of control resource set (CORESET) information, or transmit-receive point (TRP) information;
wherein the power control method further comprises: receiving a power headroom report (PHR), and wherein the PHR is associated with at least one of the TRP information or the CORESET information; and
wherein the PHR comprises a PHR associated with at least one of TRP information or CORESET information related to a PUSCH transmission carrying the PHR.

14. The method of claim 13, wherein configuring the association between the at least one piece of spatial domain resource information and the power control parameter comprises: configuring the association between the at least one piece of spatial domain resource information and the power control parameter by adopting one of following information:
power control parameter, wherein the power control parameter comprises spatial domain resource information associated with the power control parameter;
spatial domain resource information or a spatial domain resource information related parameter, wherein the spatial domain resource information or the spatial domain resource information related parameter comprises a power control parameter associated with the spatial domain resource information, and the spatial domain resource information related parameter comprises a spatial domain resource information parameter;
a power control related parameter, wherein the power control related parameter comprises at least one set of power control parameters, each set of power control parameters are associated with spatial domain resource information, and the power control related parameter comprises the power control parameter;
an association of predefined spatial domain resource information with the power control parameter; or
an association of configured spatial domain resource information with the power control parameter.

15. The method of claim 13, wherein the spatial domain resource information further comprises at least one type of space relationship information or reference signal information.

16. The method of claim 15, further comprising: in a case where spatial domain resource information in the association between the at least one piece of spatial domain resource information and the power control parameter comprises at least two types of the CORESET information, the TRP information, the space relationship information, or the reference signal information, configuring an association relationship of the at least two types.

17. A power control apparatus, comprising:
at least one processor; and
a memory communicatively connected to the at least one processor; wherein the memory stores instructions executable by the at least one processor to enable the at least one processor to perform a power control method, wherein the power control method comprises: acquiring an association between at least one piece of spatial domain resource information and a power control parameter;
acquiring spatial domain resource information of an uplink transmission; and
determining, according to the spatial domain resource information of the uplink transmission and the association between the at least one piece of spatial domain resource information and the power control parameter, a power control parameter of the uplink transmission;
wherein the spatial domain resource information comprises at least one type of control resource set (CORESET) information, or transmit-receive point (TRP) information;
wherein the power control method further comprises: acquiring a power headroom report (PHR), and wherein the PHR is associated with at least one of the TRP information or the CORESET information; and
wherein the PHR comprises a PHR associated with at least one of TRP information or CORESET information related to a PUSCH transmission carrying the PHR.

18. A power control apparatus, comprising: at least one processor; and a memory communicatively connected to the at least one processor; wherein the memory stores instructions executable by the at least one processor to enable the at least one processor to perform the power control method of claim 13.

* * * * *